United States Patent [19]

Campbell et al.

[11] Patent Number: 4,774,664

[45] Date of Patent: Sep. 27, 1988

[54] FINANCIAL DATA PROCESSING SYSTEM AND METHOD

[75] Inventors: Joseph J. Campbell; Stephen G. Berdy, both of Allentown; Raymond R. Bucchin, Kempton; Larry R. Clouse, Macurgie; Charles A. Gottardy, Quakertown, all of Pa.

[73] Assignee: Chrysler First Information Technologies Inc., Allentown, Pa.

[21] Appl. No.: 750,912

[22] Filed: Jul. 1, 1985

[51] Int. Cl.[4] .............................................. G06F 15/20
[52] U.S. Cl. ..................................... 364/408; 364/400
[58] Field of Search ............... 364/408, 406, 401, 200, 364/900, 400; 335/379, 380; 340/703

[56] References Cited

U.S. PATENT DOCUMENTS

| 4,016,544 | 4/1977 | Morita et al. | 340/703 |
|---|---|---|---|
| 4,130,881 | 12/1978 | Haessler et al. | 364/900 |
| 4,141,001 | 2/1979 | Suzuki et al. | 340/711 |
| 4,186,438 | 1/1980 | Benson et al. | 364/200 |
| 4,310,838 | 1/1982 | Juso et al. | 340/703 |
| 4,566,066 | 1/1986 | Towers | 364/408 |
| 4,613,946 | 9/1986 | Forman | 364/521 |
| 4,623,964 | 11/1986 | Crelz et al. | 364/401 |

FOREIGN PATENT DOCUMENTS

| 0181438 | 5/1986 | European Pat. Off. | 364/401 |
|---|---|---|---|
| 1489573 | 10/1977 | United Kingdom | 364/408 |
| 1489572 | 10/1977 | United Kingdom | 364/408 |

OTHER PUBLICATIONS

Fritz Haüssermann, "Universal Transaction Monitor UTM–The Transaction Processing Monitor of BS2000", pp. 77–82, May 1980.
Joachim Feldmann, "Siemens Teleprocessing System–Transdata", pp. 112–118; Sep. 1978.
Ulrich Homborg, "Transdata 970 Terminal System–Distributed Processing Through Terminals", pp. 119–123; Sep. 1978.

Primary Examiner—Jerry Smith
Assistant Examiner—Kim Thanh Tbui
Attorney, Agent, or Firm—Curtis, Morris & Safford

[57] ABSTRACT

A financial data processing system and the method of operating that system are disclosed. A central processor includes a data bank into which data is written and from which data is read, this data including financial loan information that represents the balance of each loan outstanding, the interest rate payable on each loan, the principal and interest due and payable for each periodic loan payment, the identity of each debtor, the delinquency, if any, on each loan, the collection histories of respective loans and financial information relating to leases and leased property. Plural terminals, including input means (e.g. a keyboard or the like) and display means, are coupled to the central processor, each terminal being operable to write into the data bank updated financial loan information including: (i) multiple loan payment data representing principal and interest payments and the identities of respective debtors for a batch of loan payments and multiple lease payment data, and (ii) loan application data representing the identity of each applicant, the amount, type and duration of the requested loan, the interest rate payable on the requested loan and credit data representing the applicant's ability to repay operable to display data stored in and read from the data bank, including loan payment data and loan application data, summary data representing summaries of plural loans outstanding, payment delinquencies of the plural loans outstanding, collection histories of the loans, loss of loan principal caused by loans which are not repaid, and lease payment and property data.

19 Claims, 27 Drawing Sheets

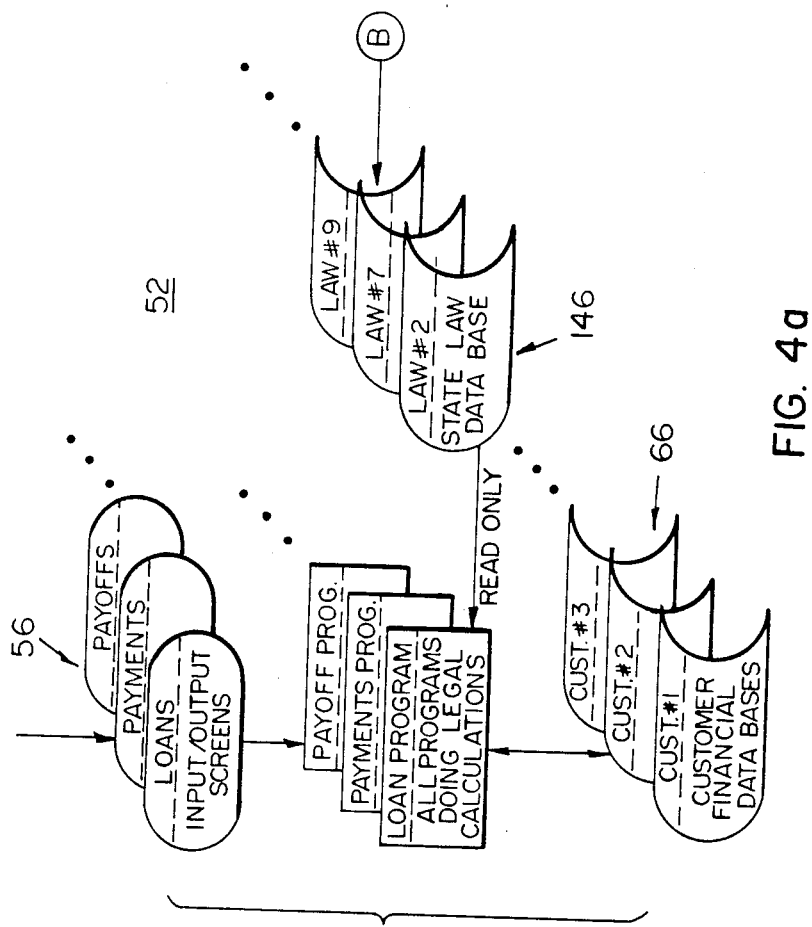

HOST MAIN MENU

ENTER OPTION    USER-ID    PASSWORD

1 – GENERAL OFFICE INQUIRY
2 – MONTHLY SUMMARY INFORMATION
3 – CUSTOMER INQUIRY
4 – DISPLAY SELECTED DETAIL
5 – PRINT SELECTED STATISTICS
6 – DEALER INQUIRY
7 – BROKER INQUIRY
8 – STATE LEGAL INFORMATION INQUIRY
9 – MEMO RECEIVING
10 – MEMO SENDING
11 – MEMO FORWARDING
12 – SYSTEM USER MAINTENANCE
13 – SYSTEM NETWORK ADMINISTRATION

FIG. 5a

```
MMM0001                         MAIN MENU
                     USER -ID ==>           OFFICE DATE:
                                            SYSTEM DATE: 06-10-1985
ENTER OPTION ==>  4             21M0001     PASSWORD ==>
  1 - DAILY OFFICE PROCEDURES             11 - OFFICE INQUIRY
  2 - CUSTOMER APPLICATIONS               12 - OFFICE FILE MAINTENANCE
  3 - CUSTOMER LOANS/ADVANCES/ADD-ONS     13 - DEALER INQUIRY
  4 - CUSTOMER PAYMENTS                   14 - DEALER FILE MAINTENANCE
  5 - CUSTOMER COLLECTIONS                15 - BROKER INQUIRY
  6 - CUSTOMER SAVINGS                    16 - BROKER FILE MAINTENANCE
  7 - CUSTOMER INQUIRY                    17 - SYSTEM USER FILE MAINT.
  8 - CUSTOMER FILE MAINTENANCE           18 - TEFRA FILE MAINTENANCE
  9 - RECEIPTS AND DISBURSEMENTS
 10 - FORMS PRINTING
          ENTER = CONTINUE              ALT AND SYS REQ = EXIT
RESPONSE:
```

FIG. 7

```
MFP0000                          CUSTOMER PAYMENTS                      06-10-1985
01060007
 **   ENTER OPTION      ==>  1            EFFECTIVE DATE   ==>
      ENTER ACCT.NBR    ==>                 OR LAST NAME   ==>          (MAX 10 CHARS)
                                             1ST INITIAL   ==>
 *** NOTE: THE ABOVE APPLIES ONLY TO OPTIONS 3 THRU 13 ***
  1 MULTIPLE MAIL (PERSONALINE CREDIT)     9 DEFERMENT
  2 MULTIPLE MAIL                         10 SPECIAL
  3 SINGLE                                11 INSURANCE
  4 PAYOFF                                12 ADD-ON
  5 CORRECTION                            13 ADD-ON PAYOFF
  6 VOID CORRECTION                       14 OTHER BRANCH
  7 REVERSAL (NSF)                        15 MULTIPLE MAIL (LEASING)
  8 VOID REVERSAL
         ENTER =CONTINUE    (PF1) =HELP                (PF4) =MAIN MENU
RESPONSE:  MFP 0165A USER HAS INQUIRY CAPABILITY ONLY ...UPDATE IGNORED
```

CUSTOMER PAYMENTS
                          MULTIPLE MAIL

MFP 0001
01060007

ACCOUNT              PAYMENT
NUMBER               AMOUNT
_____          _____
_____          _____
_____          _____
_____          _____
_____          _____
_____          _____
_____          _____
_____          _____
_____          _____
_____          _____
_____          _____
_____          _____

MAXIMUM OF 12 PAYMENTS MAY BE ENTERED
(ENTER) =CONTINUE     (PF1) =HELP       (PF3) =PRIOR SCREEN     (PF4) =MAIN MENU
RESPONSE:                                                       RESPONSE
```

FIG. 9

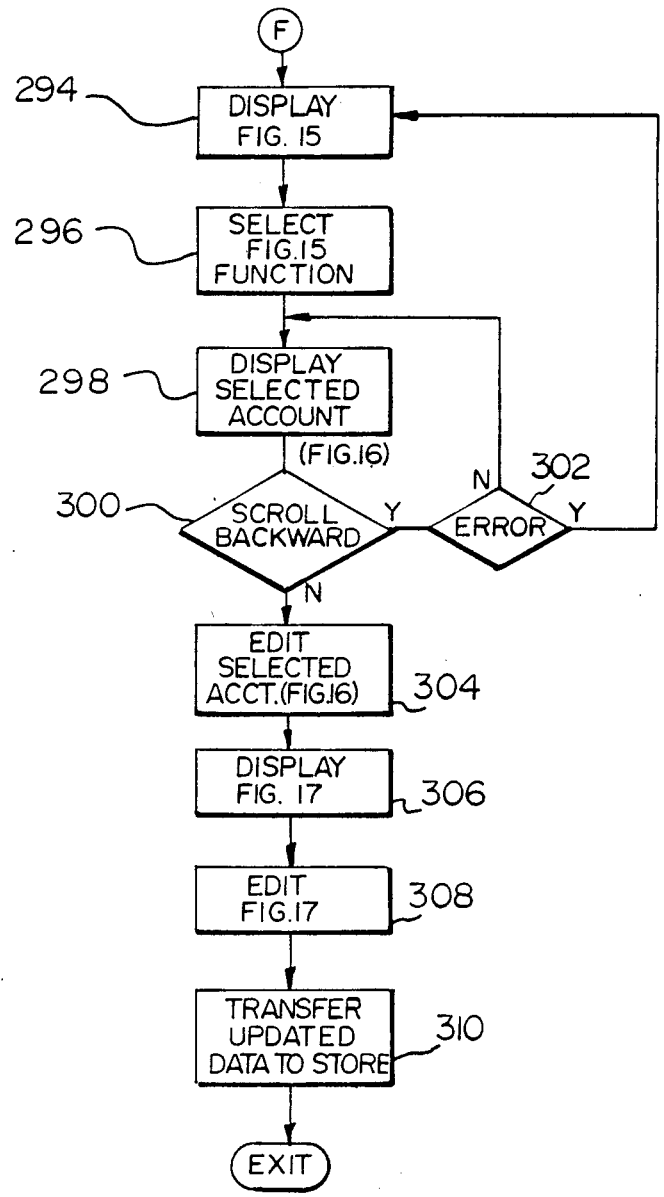
FIG. IIB

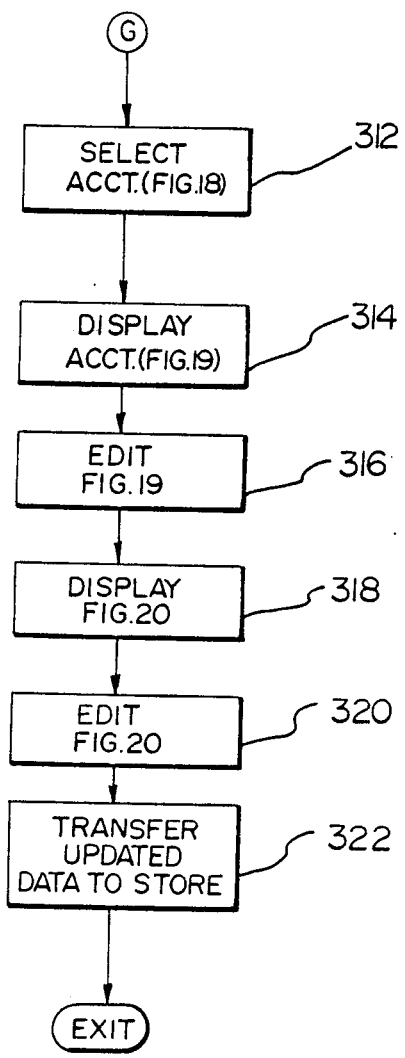
FIG. IIC.

```
MCL1000                    COLLECTION/FOLLOW-UP SUB MENU              06-11-1985
01050057
                              ENTER OPTION      ==>
                              ACCOUNT NUMBER    ==>
                              LAST NAME         ==>
                              FIRST INITIAL     ==>

1 - MULTIPLE COLLECTIONS
   2 - COLLECTION FUNCTION
       (ACCOUNT NUMBER OR LAST NAME & FIRST INITIAL OPTIONAL)
   3 - LEASE COLLECTION FOLLOW-UP
       (ACCOUNT NUMBER OR LAST NAME & FIRST INITIAL OPTIONAL)
   4 - LEASE INSURANCE/TITLE FOLLOW-UP
       (ACCOUNT NUMBER OR LAST NAME & FIRST INITIAL OPTIONAL)

ENTER = CONTINUE              (PF1) = HELP              (PF4) = MAIN MENU
RESPONSE:
```

FIG. 12

MCL3000          06-11-1985
01050057

COLLECTION CATEGORY SELECTION

ENTER OPTION ==>
ENTER OPTIONAL PAGE NUMBER ==> 001

1    1 THRU   5 DAYS              08 PAGES AVAILABLE
2    6 THRU  10 DAYS              17 PAGES AVAILABLE
3   11 THRU  15 DAYS              08 PAGES AVAILABLE
4   16 THRU  29 DAYS              07 PAGES AVAILABLE
5   30 THRU  59 DAYS              02 PAGES AVAILABLE
6   60 THRU  89 DAYS              02 PAGES AVAILABLE
7   90 THRU 119 DAYS              02 PAGES AVAILABLE
8  120 THRU 149 DAYS              00 PAGES AVAILABLE
9  POTENTIAL CHARGE OFFS          03 PAGES AVAILABLE
10 REPOS/FORECLOSURES             01 PAGES AVAILABLE
11 LEGALS                         01 PAGES AVAILABLE
12 JUDGEMENTS                     02 PAGES AVAILABLE
13 BANKRUPTS                      01 PAGES AVAILABLE
14 CHARGE OFFS                    01 PAGES AVAILABLE
15 STATUS ON ALL ACCOUNTS         04 PAGES AVAILABLE (PF3) = PRIOR SCREEN       (PF4) = MAIN MENU

ENTER = CONTINUE
RESPONSE:

FIG. 13

```
MCL4200                              MULTIPLE COLLECTIONS                              06-11-1985
01050057                                                                                 PAGE 001
SEQ.            NAME         RES. NBR.          POE NBR.               SECURITY SOL
   DD   PAYMENT            BALANCE     DLP       TOTAL    DUE ACTION    HOLD PPA  SP  NA  ACCT.  NBR.
DATE COL.ID *WHERE *ACTION SOLUTION HOLD DATE                           REMARKS
1 WILLIAM        H JOHNSON
   10    724.65         82,610.10 08 06       724.65 PMP   6 1 2/IM     000-000-0000           RFC
6 13 UD                                                                                   C55158892
2 PAUL           K FLANAGAN
   06    581.26         80,795.14 08 13       581.26 PMP   6 1 2/IM     001-674-6967          RFC
6 13 UD                                                                                   C55166986
3 DAVID          M SEE
   07    529.49         61,420.84 08 16       529.49 PMP   6 1 2/IM     213-427-5414          RFC
6 13 UD                                                                                   C55174154
4 CLIFFORD       E KIRST
   07    344.18         19,274.08 08 02       344.18 PMP   6 1 2/IM     000-000-0000          RFC
6 13 UD                                                                                   C55176498
5 ELIAS          D QUINTANA
   08    789.08         93,111.44 08 10       789.08 PMP   6 1 2/IM     714-891-4911          RFC
6 13 UD                                                                                   C55214125
  (PF7) = SCROLL BACKWARD            (PF8) = SCROLL FORWARD        (PF1) = HELP
TER OPTION ==>    ENTER = CONTINUE          (PF3) = PRIOR SCREEN   (PF4) = MAIN MENU
RESPONSE:
```

FIG. 14

```
MCL4000                    COLLECTION CUSTOMER SELECTION                            06-11-1985
01050057                                                                            PAGE  01

STATUS = 1 THRU 5 DAYS

NAME              BALANCE      BEST CONTACT      CALL DATE   HOLD DATE   COL.ID
01 01 W JOHNSON       82610.10                         05 15       06 01      UD
01 02 P FLANAGAN      80795.14                         05 15       06 01      UD
01 03 D SEE           61420.84                         05 15       06 01      UD
01 04 C KIRST         19274.08                         05 15       06 01      UD
01 05 E QUINTANA      93111.44                         05 30       06 01      UD
01 06 W SCOTT         60660.00                         05 30       06 01      UD
01 07 M BATRA          2659.25                         05 30       06 01      UD
01 08 R NORRIS        48597.92                         05 30       06 02      UD
01 09 A WUOLLET       39469.00                         05 29       06 02      UD
01 10 H ROBINSON      47278.41                         05 20       06 03      UD
01 11 M MERWIN         1468.08    ANY TIME             06 03       06 05      UD
01 12 F MURRIETA      25995.43                         05 29       06 05      UD
01 13 R GOODMAN       25013.59                         06 03       06 05      UD
01 14 L DRINNON        2595.88    ANY TIME             05 30       06 05      UD
01 15 R ALKINS         2331.29    ANY TIME             05 30       06 05      UD (PF7) = SCROLL BACKWARD         (PF8) = SCROLL FORWARD       (PF4) = MAIN MENU
ENTER OPTION ==>       ENTER = CONTINUE    (PF3) = PRIOR SCREEN
RESPONSE:
```

FIG. 15

```
MCL4005                                                                      06-11-1985
CLASS ACCOUNT NUMBER ==>   519181            COLLECTION CONTACT
     ACCOUNT NO.       DUE DATE       PRODUCT LINE     RECOURSE PLAN   N    STOP PAYMENT
     C55142326            07          REC VEHICLES         NOTE DATE                  *DEALER NO.
NAME AND ADDRESS                                           12 08 83                082 M55001469
RICHARD      T NORRIS                       CO-BORROWER NAME, EMPLOYER,BUS.PHONE
1303 S GERTRUDA AVE                         MARY                NORRIS
REDONDO BEACH        CA     90277           SELF
EMPLOYER:    20TH CENTURY FOX               213 540 8246 EXT 0000
SPECIAL INFO:                               PAY DAY
BUSINESS PHONE 213 203 2308 EXT 0000           CONDITION
HOME PHONE     213 540 8246 NO ANSWERS                     CONFIDENTIAL
NEARBY PHONE   000 000 0000 PROMISES BROKEN                SOLICITABLE                    41,117.66
BEST CONTACT                NO. OF NSF'S                   INS. CODE                      MNN
PLACE                       NO. OF TIMES 30                ADD-ON DATE (PD)
TOTAL NOTE     52,069.20    NO. OF TIMES 60                INS. EXPIRE (PD)
BALANCE        48,597.92    NO. OF TIMES 90                LAST STATEMENT     09 22 84
ADD-ON AMT.                 SECURITY           RFC         STATEMENT BAL.              48,597.92
REG. PAYMENT      433.91    TERM               120         LAST DEFERMENT
ONE LATE FEE                REMAINING TERM     112         MONTHS DEFERRED
TOTAL DUE         433.91    OTHER ACCOUNTS                 APR                            14.9986

ENTER = CONTINUE    (PF1) = HELP    (PF5) = NO ANSWER    (PA2) = CANCEL
RESPONSE:
```

FIG.16

```
MCL4010                                                                              06-11-1985
01050057
                              COLLECTION COMMENT
                    STATUS  =  1 THRU 5 DAYS
              BORROWER                          MARY                    4
RICHARD     T NORRIS                                              CO-BORROWER
   PAST DUE AMOUNT           433.91   AVG. DAILY INT.               NORRIS
   PRINCIPAL SHORTAGE        433.91   REG. PAYMENT          433.91
   ADD-ON DUE                         ADD-ON PAYMENT
   INTEREST DUE                       INTEREST CALC. TO  9 11 1984
   LATE FEES DUE                      REPOSSESSION DATE
AMOUNT PAID   INTEREST  LATE FEES  PRINCIPAL  NEW BALANCE   DATE     PAID PCODE CHGS TO
   433.91                             433.91    49,465.74   6 12 84    PY    9
   433.91                             433.91    49,031.83   7 10 84    PY    9
   433.91                             433.91    48,597.92   8  7 84    PY    9
TYPE/DATE LETTER                          STOP PAYMENT (Y=YES) MONTH PAID THRU  08
SPECIAL ACTIVITY =
DATE   COL.ID *WHERE *ACTION SOLUTION HOLD DATE           REMARKS
5 15    UD     TR    PMP      2/IM    5 10 1985
5 30    UD     TR    PMP      2/IM    6  1 1985
5 30    UD     TR    PMP      2/IM    6  2 1985
6 13    UD

ENTER = CONTINUE   (PF1) = HELP    (PF3) = PRIOR SCREEN   (PA2) = CANCEL
RESPONSE
```

FIG. 17

```
MCL4001                    LEASE INSURANCE/TITLE FOLLOW-UP                    07-23-1985
                                                                              PAGE 01
                        STATUS = INSURANCE EXPIRED
                        CATEGORY

NAME         DELQ/INS/TITLE  ACCT NBR    BEST CONTACT  CALL DATE  HOLD DATE  COL-ID
01 JOHN W GOR  009       *         L55116314                   00 00     00 00
02 ROBERT L S  014       *         L55176771                   00 00     00 00
03 CALIF STUF  014       *         L5517650                    00 00     00 00
04 MONTERY DO  004       *         L55117783                   00 00     00 00
05 L C O A LA  009       *         L55176136                   00 00     00 00
06 SINGING HI  004       *         L55176417                   00 00     00 00
07 SAN DIEGO   000       *         L55176730                   00 00     00 00
08 ERROL FINE  004       *         L55120563                   00 00     00 00
09 HUAN-HSIUN  009       *         L55122882                   00 00     00 00
10 LINDA R CA  009       *         L55123310                   00 00     00 00
11 IRA A KRAU  004       *         L55123393                   00 00     00 00
12 CAROLYN RU  014       *         L55124144                   00 00     00 00
13 JOSEPH L S  004       *         L55124797                   00 00     00 00
14 LOUIS A ZI  004       *         L55125364                   00 00     00 00
15 GARY B WIM  004       *         L55127014                   00 00     00 00

(PF7) = SCROLL BACKWARD         (PF8) =  SCROLL FORWARD
ENTER OPTION ==>     ENTER = CONTINUE     (PF3) = PRIOR SCREEN
RESPONSE
```

FIG. 18

```
MCL4006              LEASE COLLECTION/FOLLOW-UP CONTACT
   OLD LEASE NUMBER  ==>    008149                             STATUS
   LEASE NO: L55116314  PRODUCT LINE OPEN CONSUMER             DEALER NO M76015894
   NAME AND ADDRESS
J                 JOHN W GORDON
PO BOX 683
WALNUT                     CA     917890000
EMPLOYER:
SPECIAL INFO:                                                          NO ANSWERS
BUSINESS PHONE   714 598 2828  EXT 0000
HOME PHONE       714 877 2600  *CONTACT DAY/TIME                       LAST STMT    2 14 1985
    *PASTDUE*            *SCHEDULED*
BASE PMT:             531.01   LEASE DATE    11 20 1983                DDC:
TAX  .065000           34.52   TERM                    48                 11 - 29 DAYS
TOTAL PMT:            565.53   MONTHS REMAINING        30                 30 - 59 DAYS
OTHER CHG(S)                   VEHICLE 00                                 60 - 89 DAYS
UNPAID LATE CHG                INITIAL VALUE   26,952.00                  90+     DAYS
                               RESIDUAL        11,655.84
TOTAL DUE             565.53   BASE PMT           531.01               *INS:              *
                               TAX  .065000        34.52                TITLE:
DUE FOR:  5 20 1985            TOTAL PAYMENT      565.53

ENTER    = CONTINUE     (PF1)  = HELP      (PF5)  = NO ANSWER        (PA2)   = CANCEL
RESPONSE:  MCL 0113A MODEL CODE NOT FOUND ON RMMT FILE
```

FIG.19

```
MCL4011                    LEASE COLLECTION/FOLLOW-UP COMMENT              07-23-1985
LEASE NO: L55116314        PRODUCT LINE    OPEN CONSUMER    DEALER NO M76015894
NAME
J           JOHN W GORDON
    *** PASTDUE ***        *** SCHEDULED ***                    STATUS
BASE PMT:        531.01    LEASE DATE      11 20 1983                       DDC:
TAX .065000       34.52    TERM                    48                       11 -  29 DAYS
TOTAL PMT:       565.53    MONTHS REMAINING        30                       30 -  59 DAYS  1
OTHER CHG(S)               VEHICLE                                          60 -  89 DAYS
UNPAID LATE CHG            INITIAL VALUE    26,952.00                       90+      DAYS
                           RESIDUAL         11,655.84
TOTAL DUE        565.53    BASE PMT            531.01                       INS:           *
                           TAX .065000          34.52                       TITLE:
DUE FOR:    5 20 1985      TOTAL PAYMENT       565.53

SPECIAL ACTIVITY =
DATE COL.ID *WHERE *ACTION SOLUTION HOLD DATE              COMMENTS 6 13   UD

ENTER = CONTINUE       (PF1) = HELP      (PF3) = PRIOR SCREEN      (PA2) = CANCEL
RESPONSE:
```

FIG. 20

FINANCIAL DATA PROCESSING SYSTEM AND METHOD

BACKGROUND OF THE INVENTION

This invention relates to a financial data processing system and a method of operating that system for keeping accounts of loans, loan histories, leases, and pertinent information relevant to each loan and each lease.

Prior to the invention described below, financial information was maintained primarily by handwritten bookkeeping entries. Ledger cards had been used for keeping account of each loan, including information concerning the debtor, information concerning the repayment of each loan, and information concerning attempts, when necessary, to notify and inquire of the debtor in the event that his loan repayments had been delinquent. With the advent of computerized data processing apparatus, many of the aforementioned financial tasks have been facilitated by entering some of the financial data mentioned above into computerized data banks from which that data may be readily retrieved. However, in many systems, hard copies (i.e. printed documents) of each loan transaction, loan history and updated information had been used to keep account of each loan. Furthermore, although individual systems have been developed and have been used to implement individual ones of the various operations that are used for financial loan accounts, there has been no suggestion prior to the instant invention of integrating all of these individual operations and functions into a single centralized system. For example, the processing and history of loan payments might be implemented in a data processing system, but that system is not useful with another system by which lease processing and accounts are maintained. Similarly, histories and details of collections and attempts to collect loans generally have not been stored in electronic data processing systems. Rather, such information relating to loan collections usually is stored in the form of "hard copy" of paper documents.

Still further, some data processing systems which have been used to process and keep account of various loans are not of the so-called "real-time" or on-line systems. Rather, such prior systems process information that is gathered during the day in a so-called "batch" mode during off hours. Consequently, neither a customer (or debtor) nor an operator of the data processing system would be aware of two or more transactions that are made by that customer during a day.

One example of a prior art system which suffers from the disadvantages mentioned above and which is not operable to integrate all of the desired financial loan processing and accounting functions is the CLASS system which had been developed for FinanceAmerica Corporation of Allentown, Pa.

OBJECTS OF THE INVENTION

Therefore, it is an object of the present invention to provide a centralized financial data processing system which avoids the aforenoted disadvantages of prior art systems, which integrates various individual loan and financial processing and accounting systems, and which provides various functions and operations not available heretofore.

Another object of this invention is to provide a central processing system and method of operating that system, in which a data bank provided at a central processor is used to store relevant financial loan information, the data bank being updated in real time.

A further object of this invention is to provide a financial data processing system which utilizes a host computer coupled, via suitable communication channels, to various distributed processors, such as mini-computers, each mini-computer being connected to one or more offices, and each office containing one or more terminals for accessing and updating financial loan information that is maintained at both the host computer and respective ones of the distributed processors connected thereto.

An additional object of this invention is to provide a financial data processing system in which restrictions are placed on the authority of various system users, and in which various decisions made by the users are based upon the financial data stored in the system as well as various laws and regulations promulgated by individual states, the prerequisites of such laws and regulations also being stored in the system.

Various other objects, advantages and features of the present invention will become readily apparent from the ensuing detailed description, and the novel features will be particularly pointed out in the appended claims.

SUMMARY OF THE INVENTION

In accordance with a broad, general feature of this invention, a financial data processing system and a method of operating that system are provided. A central processor includes a data bank into which data is written and from which data is read, that data including financial loan information representing, inter alia, the balance of respective loans outstanding, the interest rates payable on those loans, the principal and interest due and payable for respective, periodic loan payment, the identities of the respective customers (or debtors) and the various delinquencies of payment on the respective loans. The data bank also includes information representing laws and regulations of individual state governments which control and regulate the various parameters of loans, such as interest rates, durations, maximum amounts lendable, qualifications of debtors, and the like.

Plural terminals are coupled to the central processor, each terminal having an input means, such as a keyboard, and a display means, such as a video display terminal (VDT). Each terminal is operable by an operator to write into the data bank updated financial loan information and to access the financial loan information stored therein. Preferably, only those operators with predetermined authorizations, as determined by various identity codes, are permitted to update or change the financial loan information stored in the data bank. The central processor is suitably programmed to recognize such authorizations.

In accordance with one desirable aspect, the input means is operable to enter into the data bank multiple loan payment data representing principal and interest payments and the identities of respective debtors for a batch of loan payments. As a numerical example, loan payments on twelve separate accounts may be entered in a single batch, each of those loan payments being credited as to the payment of interest, principal and other charges. Such multiple loan payment processing facilitates the payment by mail from customers of bank credit cards, lines of credit, secured or unsecured loans, mortgage payments, lease payments, and the like.

As another aspect of the financial data processing system of the present invention, the input means is operable by the operator to enter a loan application data into the data bank, this loan application data representing the identity of each applicant, the amount, type and duration of the requested loan, the interest rate payable on the requested loan, and credit data representing the applicant's ability to repay the requested loan. The stored loan application data is utilized in the event that the applicant requests subsequent loans, leases or other transactions implemented by the financial data processing system. Such loan application data also is usable by an operator of the system when making inquiries of customers whose loan repayments may be delinquent. Such loan application data also is utilized by supervisory personnel in determining whether an applicant's credit qualifications are satisfactory and whether various loans and/or leases are to be approved or rejected.

The display means included in the aforementioned terminal are operable to display data stored in the data bank, including loan payment and loan application data, summary data representing summaries of plural loans outstanding, payment delinquencies of those outstanding loans, collection histories of those loans and losses of loan principal caused by loans which are not repaid. Other preselected summaries also may be displayed upon suitable input requests from the input means, such as the profitability of various loans, the quantity of loans in different categories, and demographic data that is indicative of various profits, losses and volume of various financial products that are processed and accounted for by the financial data processing system.

In accordance with one aspect of this invention, the central processor comprises a host computer coupled, by means of conventional communication channels, to distributed processors, such as mini-computers, located in regions spaced from the host computer. Each mini-computer may be connected to one or more regional offices, and each office may include one or more of the aforementioned terminals. The host computer serves as a back-up and archive for the financial records utilized by the mini-computers in processing and keeping account of the financial data used by those offices to which the respective mini-computers are connected. The host computer communicates with the various mini-computers in real time, such that updated financial data that is written into a data bank at a mini-computer is transferred, in real time, to the data bank located at the host computer. Preferably, but not necessarily, changes in state laws and regulations may be made at the host computer; and such changes subsequently may be transmitted, if needed, to the mini-computers.

One or more terminals may be connected to the host computer; and the host is programmed such that an operator at one of those terminals may communicate with a mini-computer as if the host is "transparent". One advantage of utilizing distributed mini-computers resides in the fact that the overall financial data processing system is capable of continued operation even in the event of a malfunction at one or more terminals, offices or mini-computers. Likewise, in the event of a significant malfunction at the host computer, the data banks provided at each mini-computer nevertheless permit those mini-computers to continue operation.

In a preferred embodiment, each display means is provided with a multi-colored VDT, such as an IBM Model 3279 display. This colored display provides alphanumeric information of different colors, one color representing predetermined headings, categories or titles to identify information associated therewith, another color indicating an erroneous entry of data or an error message in the event of an erroneous entry, yet another color representing information which, once entered, cannot be varied during normal operation of terminal, such as the identity of a customer, the duration of a loan, the initial principal of that loan, and the like, and yet another color which indicates data that normally is entered and updated at a terminal, such as the amount of a loan payment, the date on which that payment is made, etc.

Still another desirable feature of the present invention is the use of menu processing. That is, the central processor is programmed to provide a display of a menu of all of the financial transactions that may be processed at a terminal. Depending upon the selection of a particular financial transaction, the central processor is programmed further to provide a display at that terminal of various functions or options relating to the selected transaction which may be implemented at the terminal. Then, depending upon the option which is selected, additional sub-menus are displayed in accordance with the program of the central processor. Thus, an operator need not be a highly trained technician, nor need the operator memorize all of the possible financial transactions and options that may be selected. Rather, the operator merely need be aware of basic financial loan transactions so as to follow, in a step-by-step manner, the various menus and "prompts" provided by the central processor and displayed at the VDT.

Yet another feature of this invention is the ability at each office and at a central site to print hard copies of various loan documents. In particular, the data to be printed is stored in various queues for subsequent printing during times when the central processor (or distributed mini-computers) experience relatively low volumes of activity. Consequently, the important data processing time that otherwise is utilized to process loan transactions need not be curtailed for the purpose of printing a loan document.

BRIEF DESCRIPTION OF THE DRAWINGS

The following detailed description, given by way of example, and not intended to limit the present invention solely to the described embodiments, will best be understood in conjunction with the accompanying drawings in which:

FIGS. 4A and 4B are schematic representations of the manner in which the data base of the central processor, preferably, the host central computer, is supplied with updated laws and regulations promulgated by the various state governments;

FIG. 7 is a representation of a display "screen" of the main, or primary, menu of financial transactions that may be selected and implemented by the financial data processing system;

FIG. 8 represents a display screen of a sub-menu of a category of financial transactions selected from the main menu;

FIG. 9 is a display screen of a "multiple payment" data entry format selected from the sub-menu shown in FIG. 8;

FIGS. 11A–11C constitute a flow chart of the manner in which a "collections" financial transaction, selected from the main menu illustrated in FIG. 7, is illustrated;

FIGS. 12–20 represent display screens that are used in conjunction with the "collections" routine represented by the flow charts shown in FIGS. 11A–11C.

DETAILED DESCRIPTION OF A PREFERRED EMBODIMENT

The following detailed description is intended to provide an understanding of the manner in which the financial data processing system of the present invention is implemented and operates. Some of the particular financial transactions that are implemented by this system are described in detail. Other such transactions are described more generally. In the interest of brevity, a detailed description of each and every one of the financial data transactions that may be carried by the data processing system of the present invention is not provided. Based upon the detailed description of certain examples, taken in conjunction with the state of the programming art and the knowledge of those of ordinary skill in that programming art, particular programs, routines and subroutines for carrying out those financial transactions which are described broadly will become readily apparent.

Figure 1:
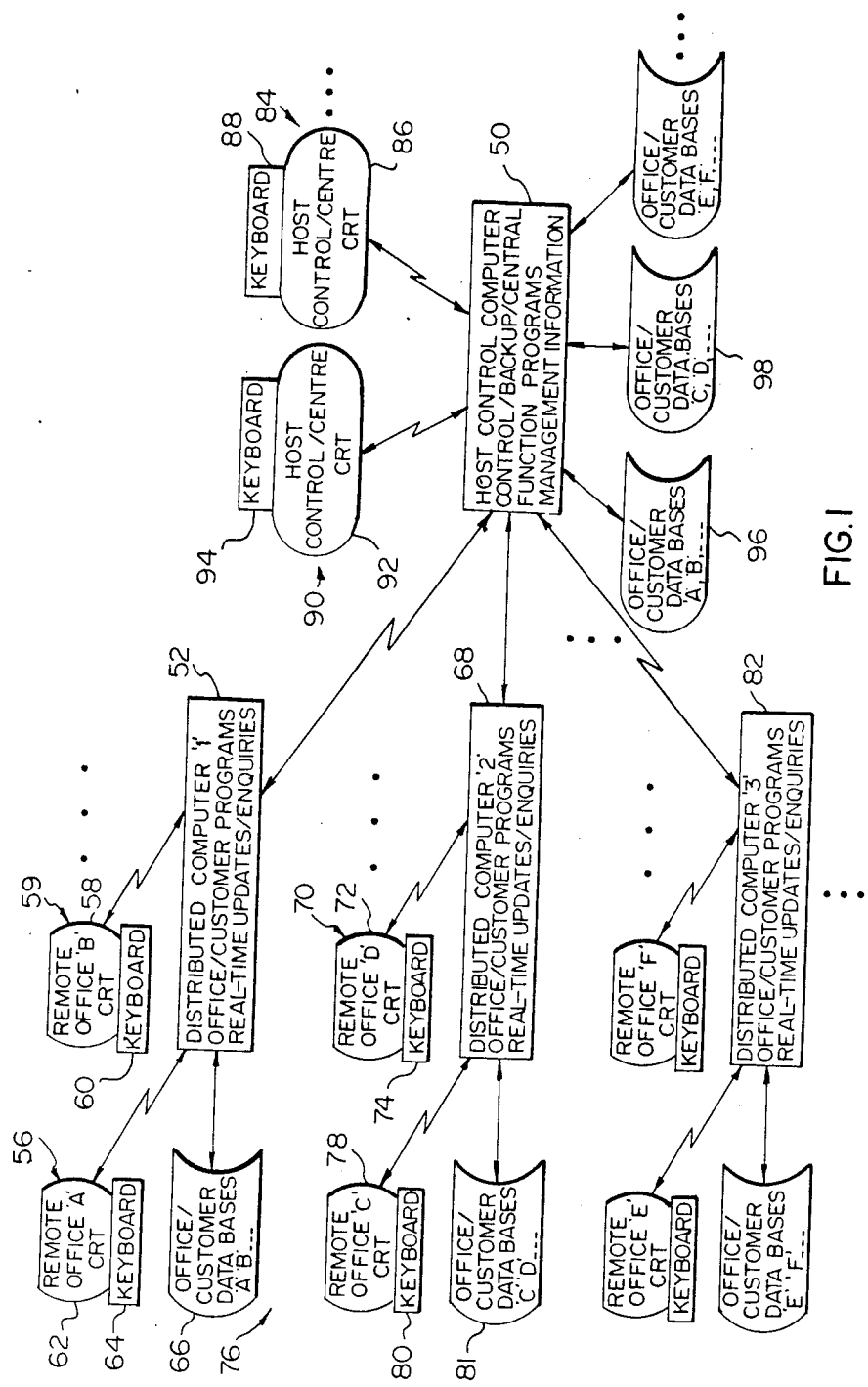
FIG. 1 is a block diagram of the financial data processing system in accordance with this invention, and which is provided with a host central computer and various distributed mini-computers.

Turning now to the drawings, FIG. 1 is a schematic representation of a preferred embodiment of the overall financial data processing system. This system is comprised of a host central computer 50 that is coupled by way of conventional communication channels, such as telephone lines or the like, to various distributed minicomputers 52, 68 and 82. It is appreciated that host computer 50 may be coupled to several additional minicomputers, not shown. Host computer 50 may be an IBM Model 3031 and/or 4341 main-frame computer. Each mini-computer, also referred to herein as a "distributed computer", may be an IBM Model 8140 processor.

In the embodiment depicted in FIG. 1, a distributed computer, such as computer 52, is coupled by suitable communication channels to various offices that may be remote from the computer, these offices being designated as remote offices, such as remote office A 56 and remote office B 54. Each office may be physically spaced from the site of computer 52 or, alternatively, one or more of the remote offices may be located in the same physical structure or building therewith. Although only two remote offices are illustrated as being connected to computer 52, it will be appreciated that several additional remote offices may be connected thereto. A number of such remote offices may be grouped into various regions, and each distributed computer may be connected to one or more groups, or regions, of such offices. Each office is capable of conducting financial transactions with computer 52, and the computer includes suitable storage apparatus, such as magnetic disks, tapes or the like, capable of storing approximately 15,000 active customer account records of various types. As a numerical example, each distributed computer 52, 68 and 82 may be coupled to up to sixteen remote, or branch, offices.

The storage apparatus provided at each distributed computer stores data banks, or data bases, the data including financial loan information of the various customers that are serviced by the remote offices connected to that computer. As used herein, the expression "service" or "servicing" means the undertaking of various financial transactions with, on behalf of or related to a customer. As also used herein, the expression "customer" means a debtor, that is, an individual (either real or legal) to whom a loan is made or to whom property has been leased. Such customers also may conduct various banking transactions with or at the remote offices, such as deposits or withdrawals from various bank accounts, the purchase and redemption of financial paper, and the like. Information relating to the customer's loans, leases, bank accounts, financial paper transactions, and the like are included in the "financial information" that is stored in data bank 66.

Remote office A 56 and remote office B 54 are similar and, in the interest of brevity and simplification, only one of these remote offices is described. It is appreciated that, similarly, remote offices 70 and 76 also are similar to remote offices 54 and 56. Each remote office includes one or more terminals, and each terminal is provided with a video display device, such as a video display terminal (VDT). The VDT may be a conventional display, such as an IBM 3276 or 3279 VDT. Preferably, the VDT includes a color CRT such as the IBM 3279 VDT. Each terminal also is provided with input means by which data may be manually entered by an operator to computer 52 for storage in data bank 66. Preferably, the input means comprises a keyboard, such as keyboard 60 or keyboard 64, the keyboard being of conventional construction. The keyboard is operable by an operator to write financial data into data bank 66 under the programmed control of computer 52. The financial data information written into data bank 66 is described in greater detail below, and includes multiple loan payment data representing principal and interest payments and the identities of respective customers, this data being entered for a "batch" of loan payments. As used herein, the expression "batch" means a plurality of separate transactions that are entered during a single operation (but, it will be appreciated, not necessarily in response to a single key stroke) of keyboard 60. The entry of such loan payment data is described below.

Keyboard 60 (or 64) also is operable to write loan application data into data bank 66. Such loan application data preferably represents the identity of each applicant, the amount, type and duration of the requested loan, the interest rate payable on the requested loan and credit data representing the applicant's ability to repay the requested loan, such as the applicant's age, employer, business or occupation, security, collateral, co-signer of a note evidencing the loan, etc. Such data is stored not only in data bank 66 of computer 52, but this data also is transmitted to host central computer 50 where it is stored for the purpose of backing up the information in data bank 66. Hence, in the event that computer 52 malfunctions to the extent that the financial data information stored in data bank 66 is destroyed, this information may, nevertheless, be replaced from host central computer 50.

As will be described below, VDT 58 is operable to display various fields of data representing the financial information associated with each customer and with each loan, this financial information being stored in data bank 66. Examples of the displays provided on the display screen of VDT 58 are described below. Preferably, various data fields of the VDT display screen are displayed in different colors, thus facilitating the entry and updating of financial data, the recognition of errors, if any, and the ready understanding by an operator of the displayed information. As an example, and as will become apparent from a description of some of the displays discussed below (these displays sometimes being referred to as a "display screen" which means the information that is displayed on the screen of the VDT), one color (e.g. white) is used to display data that is fixed and not variable, such as particular headings of the display screen, another color (e.g. red) is used to display errors and error messages, yet another color (e.g. blue) is used to display information that, once entered, remains substantially fixed, such as a customer's name, identity code, an account number, etc., and yet another color (e.g. green) is used to display variable data that may be entered and updated from time to time by the operator. Examples of such enterable data include the amount and date of a loan payment.

Host central computer 50 is coupled to various terminals, such as terminals 84 and 90, each terminal being similar to a terminal connected to a distributed computer, described above. Host central computer 50 is programmed such that the user of a terminal connected thereto, such as terminal 84, may access data stored in data bank 66 at computer 52. The interaction between terminal 84 and computer 52 proceeds as if host central computer 50 is "transparent".

FIG. 1 illustrates back-up data bases 96, 98, etc., corresponding to data banks 66, 81, etc. at the distributed computers. In addition to storing back-up data, host central computer 50 is programmed to permit an operator of, for example, terminal 84, to obtain various summaries of different financial activities and different financial products. Thus, management reports may be displayed and, additionally, host central computer 50 preferably is connected to one or more printers to permit the printing of a hard copy of such summary reports. For example, summaries of home secured loans, home improvement loans, vehicular loans, unsecured loans, credit card loans, closed end loans, precalculated loans, etc. may be obtained, as well as summaries of loans in excess of a predetermined amount, loans carrying an interest rate within certain preselected ranges, loans made to different geographical areas, loans made to individuals of different ages, backgrounds, occupations, etc., also may be obtained. Suffice it to say that summary reports of different financial products based upon different demographic parameters may be extracted from the data stored in the various data bases provided at host central computer 50 under the control of the particular summary routine program of that computer. Similar summaries may be obtained by extracting the necessary data from, for example, data bank 66 at distributed computer 52 under the control of a summary routine provided in the program of that computer.

Host central computer 50 also is provided with a data bank in which data representing the laws and regulations of various state agencies having governmental control over financial transactions are stored. Such laws and regulations, as mentioned above, delimit, among other things, the interest rates and durations of various loans. As such laws and regulations change, an operator may enter such laws and regulations by suitable operation of, for example, terminal 84. The data representing such state laws and regulations may be transmitted to and stored at the various distributed computers or, alternatively, such data may be transmitted for use at a distributed computer when a particular transaction is in progress which requires such data.

The system illustrated in FIG. 1 may be thought of as a central/distributed system. In the event that a particular distributed computer, such as mini-computer 52, malfunctions, the remaining distributed computers (e.g. mini-computers 60 and 82) may continue to operate and process various financial transactions. The entire system need not be shut down in the event of a failure at one of the distributed computers. Similarly, in the event that host central computer 50 is subjected to a malfunction, each of the distributed computers nevertheless is provided with suitable financial data stored in its respective data bank so as to permit continued financial transactions with the remote offices connected thereto. It will be appreciated that additional distributed computers and remote offices may be connected to the illustrated system, as needed.

It also will be appreciated that each terminal that is coupled to a distributed mini-computer or to the host central computer may be a so-called "smart" terminal, such as a conventional microcomputer, or the like.

Figure 2:
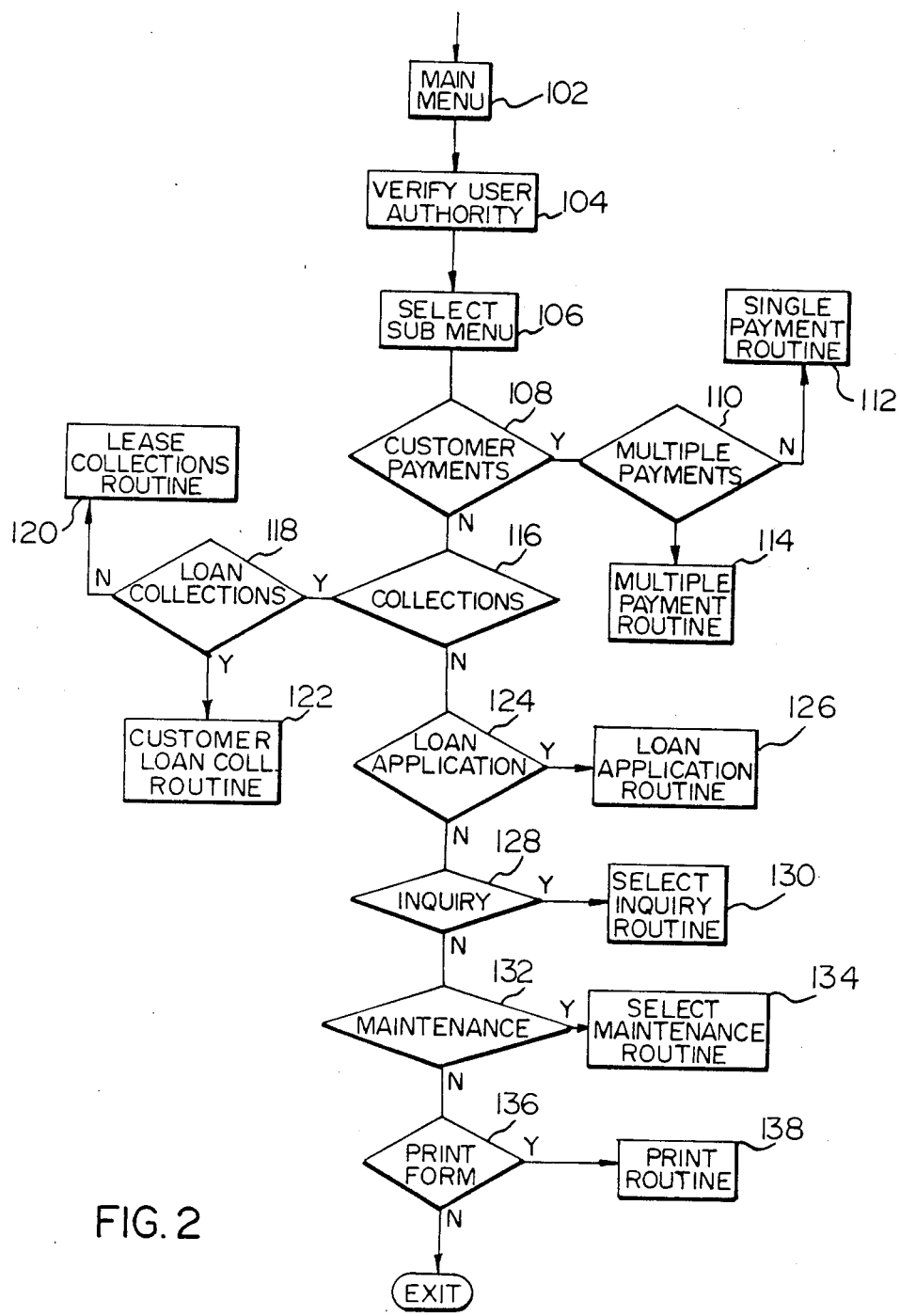
FIG. 2 is a flow chart representing the manner in which menu-driven financial transactions are implemented at the host central computer and/or at each distributed mini-computer.

One advantageous feature of the present invention, as mentioned above, is the fact that the various financial transactions and functions used to carry out those transactions are "menu-driven". That is, the central processor (as used hereinafter, the expression "central processor" is intended to refer to the distributed computer coupled to a terminal in a remote office connected thereto or to the host central computer coupled to a terminal) is programmed to display on the VDT of a terminal a "menu" of all financial transactions that may be carried out. Then, upon the selection by the operator of a particular one of those financial transactions, the central processor is programmed to provide a further display of a sub-menu of those selectable functions or transactions which fall within the scope of the transaction selected from the initial, or "main" menu. The "display screen" of the main menu is illustrated in FIG. 7. In the illustrated example, eighteen separate financial transactions may be selected by the terminal operator, the selection thereof resulting in the display of a sub-menu of functions, operations and sub-transactions by which the selection from the main menu may be carried out. FIG. 2, described below, is a flow chart representing the manner in which the transactions illustrated in the main menu display of FIG. 7 may be selected.

Referring now to FIG. 2, the main menu routine now is described. Upon operation of a particular function key of the terminal keyboard, or upon initialization of the central processor, the main menu routine 102 is implemented. Initially, the operator enters, by way of the keyboard, his identity, such as his name, his identification code or the like. FIG. 7 illustrates an alphanumeric identification code. The central processor then is programmed to verify, at 104, that the entered identification code is an authorized code. That is, the program verifies that this particular user is authorized at least to the extent of selecting a particular financial transaction from the illustrated main menu.

Following user verification 104, the processor advances to step 106 at which selection of a particular sub-menu, that is, the selection of a particular financial transaction, is detected. The selection is achieved by entering a numeral corresponding to the numeral which identifies the particular transaction that is desired. As shown in FIG. 2, the main menu routine inquires as to whether the customer payments transaction is selected. That is, inquiry is made as to whether the keyboard has been operated to enter numeral "4". If so, the customer payments sub-menu, illustrated in FIG. 8, is displayed. As shown, fifteen separate functions or transactions are associated with the customer payments sub-menu, and the operator may select any one of those fifteen functions or transactions to continue. As shown, inquiry is made, at 110, as to whether the multiple payments function is selected. This function is described, in FIG. 8, as the "multiple mail" function, identified as numeral 1 of the illustrated sub-menu. If inquiry 110 is answered in the negative, the routine advances to the single payment routine 112 in which information relating to a customer's account is read from the data bank in which it is stored, and loan payment data received from that customer is entered. It will be appreciated that the operator merely need enter into the appropriate, identified customer account the amount of this payment. The central processor is programmed to credit that account with an amount equal to the repayment of a portion of the principal, an amount equal to the payment of appropriate interest, and other charges that are paid (e.g. insurance, brokerage charges, etc.). Other suitable information also may be entered by the operator for the purpose of updating various data fields, as may be necessary, of this customer's account.

If inquiry 110 is answered in the affirmative, that is, if the multiple payments function is selected, the customer payments routine advances to the multiple payment routine 114, and the display shown in FIG. 9 is provided on the display screen. A number (e.g. twelve) of different customer accounts and the amount of payment credited to each account now is entered by the operator. For example, this operation may be carried out at an office to which loan payments are mailed. The operator may open the envelopes containing those payments, each envelope also containing a loan statement which identifies the customer, his account number and the amount of payment which is due. The operator then enters, by means of the keyboard, the account number of each customer and the actual amount of payment that has been received. The central processor is programmed to credit various portions of that payment to the principal of the loan, the interest due and additional charges. In addition, the date on which this data is entered into the system also is noted by the central processor in response to a real time clock normally provided with that processor. In the event of an erroneous entry, such as an account number that does not exist in the data bank or a payment amount that is too high, a suitable error message is provided in the field identified as "response" in the display screen of FIG. 9.

The foregoing entry of customer payments may be made from "batches" of twelve (or other desired number) customer accounts. Once the data for all twelve customer accounts have been entered, the display screen is cleared and the display illustrated in FIG. 9 is provided once again. The operator then may enter customer payment data for the next twelve accounts. In this manner, customer payment data is entered, and the account histories of those customers are updated. The updated information is stored in the data bank both at the distributed computer and at the host central computer.

If it is assumed that inquiry 108 is answered in the negative, that is, if the customer payments function on the main menu display of FIG. 7 is not selected, the main menu routine advances to inquire, at 116, if the collections transaction is selected. If so, the collections sub-menu illustrated in FIG. 12 is displayed, and inquiry next is made, at 118, if the customer loan collections function has been selected. If this inquiry is answered in the negative, it is assumed that the lease collection functions, illustrated as functions "3" and "4" in FIG. 12, have been selected, and the lease collection routine 120 is carried out.

However, if inquiry 118 is answered in the affirmative, the customer loan collection routine 122 is executed.

The function of the "collections" transaction is to determine those loans which are delinquent, or should be charged off, or should be foreclosed, or in which legal proceedings have been initiated, or which are subjected to judgments, or those customers which are bankrupt, or those loans which should be charged off. The sub-menu associated with the collections transaction is illustrated in FIG. 13. Depending upon which function illustrated in the sub-menu of FIG. 13 next is selected, suitable displays are provided on the VDT, such as shown in FIGS. 14–17, and the data displayed on those display screens may be updated, as desired.

If inquiry 116 is answered in the negative, inquiry is made at 124 if the loan application transaction is selected. If so, the loan application routine 126 is carried out.

However, if inquiry 124 is answered in the negative, the routine advances to 128 to determine if the inquiry transaction is to be carried out. If so, the inquiry routine 130 is selected, this inquiry routine serving to effect inquiries regarding customers, or one or more remote offices, or various dealers or brokers who have initiated or have been responsible for the loan transactions processed by the financial data processing system. Such dealers or brokers may include automobile dealers, real estate brokers, and the like.

If the inquiry transaction has not been selected, the routine advances to 132 to determine if the maintenance transaction has been selected. If so, the appropriate maintenance routine is selected, at 134, such as customer file maintenance, office file maintenance, dealer file maintenance, broker file maintenance, system user (or operator) file maintenance and state law/regulation file maintenance.

If inquiry 132 is answered in the negative, inquiry next is made at 136 as to whether a form or document is to be printed. If so, the processor advances to the print routine 138. However, if inquiry 136 is answered in the negative, the processor exits from the main menu routine illustrated in FIG. 2.

As mentioned above, the central processor, that is, both the distributed mini-computers and the host central computer, are programmed such that, upon suitable selection, such as the selection by an operator of transaction (or option) "10" of the main menu displayed on the VDT display screen shown in FIG. 7, a desired document may be printed. It will be recognized that each remote office, or selected ones of the remote offices, as well as the central site, are provided with suitable printers, such as a desk top printer (e.g. IBM Model 3287) for this purpose. In prior art systems, such as in the aforementioned CLASS system, hard copy printouts were made on pre-printed forms that had to be properly loaded and aligned in the printer (in the CLASS system, IBM 1980 printers were used). As a particular transaction progressed, data and information were printed on the form. In the event that the transaction could not be completed, the partially completed form was replaced with a fresh form, and the foregoing process was repeated.

Figure 3:
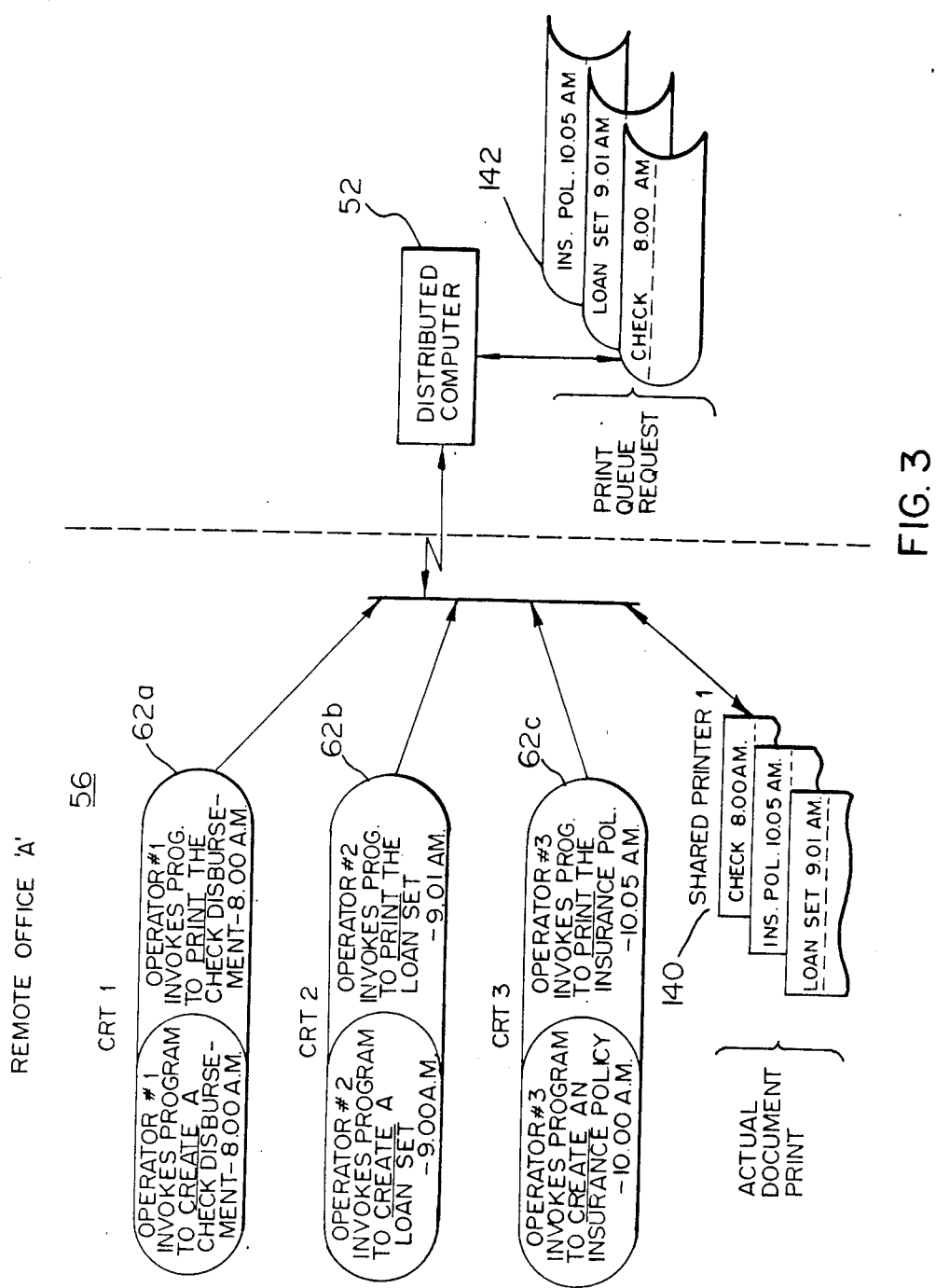
FIG. 3 is a schematic representation of the manner in which documents are printed at an office that is in communication with one of the distributed mini-computers.

In the present invention, financial transactions are processed by means of, for example, the keyboard provided at the terminal, and displays on the VDT. In the event that a particular transaction requires a hard copy print-out, it is not necessary to print the document at that time. Rather, and advantageously, the information needed to be printed is arranged in a "print queue" for deferred printing. At a suitable, subsequent time, such as during periods of low transaction activity or at a time days or weeks later when the customer is to be presented with the document, the hard copy print-out is made. FIG. 3 is a schematic representation of the manner in which a distributed mini-computer, such as mini-computer 52, cooperates with remote office 56 for printing a plurality of (e.g. three) documents.

In the embodiment illustrated in FIG. 3, it is assumed that remote office 56 is provided with three terminals having three VDT's 62a, 62b and 62c. Each terminal is coupled to mini-computer 52 and each terminal interacts with the computer for supplying data to the computer data bank and for reading and displaying information from that data bank. Remote office 56 also is provided with printer 140 which is time-shared for printing documents requested at each terminal included in the remote office. Computer 52 is provided with a print queue 142 in which requests for the printing of respective documents are stored. In one embodiment, the print queue may store all the necessary data for printing each document; and in an alternative embodiment, merely a request code is stored, together with suitable document identifying data such that, when the printing operation is carried out, the print request is used to access the necessary financial data and "form" information from the data bank, and this requested data and "form" information is transmitted from computer 52 to printer 140 for printing.

Several documents are capable of being printed at printer 140, and computer 52 is adapted to store the "form" information which uniquely defines or is usable with each such document. In the example depicted in FIG. 3, the operator at VDT 62a selects a check disbursement form to be printed, this check disbursement form having printed thereon the name of the payee, the amount of the check proceeds, the account number against which this check is charged, or other relevant data. The operator at VDT 62b selects a loan set form to be printed, this loan set form having printed thereon the identity of the borrower, the principal sum of the loan, the interest rate payable thereon, the term of the loan and other data that is material for this loan. Finally, the operator of VDT 62c selects an insurance policy to be printed, the insurance policy form having printed thereon the name of the insured, the name of the beneficiary, the proceeds of insurance, a schedule of cash surrender value, and other information relevant to that insurance policy.

It is further assumed that the operator of VDT 62a who selects a check disbursement form to be printed operates his keyboard to supply check disbursement data to computer 52 at a particular time, such as 8:00 A.M. Likewise, the operator of VDT 62b supplies computer 52 with loan set data at 9:00 A.M. Finally, the operator of VDT 62c supplies computer 52 with insurance policy data at 10:00 A.M. The data associated with each document is stored in the print request queue 142 in the same order as the times at which that data is supplied to computer 52. Then, when the particular form or document is to be printed, each request in the print queue is read out and used by computer 52 to transmit the necessary print-control signals and data to printer 140. As depicted in FIG. 3, although print requests had been stored in the following order: check disbursement, loan set, insurance policy, the documents are not necessarily printed in that order. As illustrated, printer 140 first prints the loan set form, and then the insurance policy form, and then the check disbursement form. The order in which these documents are printed is determined by the operators at remote office 56. For example, in the illustrated embodiment, it is assumed that the customer who has requested the loan set document should receive that document before the customer who has requested the insurance policy before the customer who has requested the check. It will be appreciated that the documents to be printed, and the print requests which are stored in print queue 142 may be printed in any desired order, depending upon the print-out requests that are transmitted to computer 52 from remote office 56. Typically, documents which are to be printed for use by customers are printed out in the order in which the customers arrive at the offices to claim those documents. If such documents are to be mailed to the customers, they may be printed out in an order determined by the operators or supervisor of remote office 56.

If desired, a document whose print request is stored in print queue 142 may be printed immediately upon sending a suitable print-out request to computer 52. For example, if check disbursement data is created and entered into computer 52 while the customer is present at remote office 56, the check disbursement form may be printed out immediately so that no noticeable delay occurs in furnishing that customer with his check.

Although not shown in FIG. 3, each terminal may have the information that is displayed on the display screen of a VDT printed, as is, in hard copy. A suitable "print" key is provided to transfer the displayed data to printer 140 for immediate printing.

In addition to the printing feature provided at each remote office under the control of the mini-computer connected thereto, a similar print operation is carried at the central site for printing of documents and forms on a centrally located printer under the control of host computer 50. For example, credit rejection notices, loan repayment statements, lease statements, income tax reporting statements, and the like, all may be printed at the centrally located printer (or printers). The information printed on those forms is, of course, stored in the data bank provided at the host computer, and selected data fields are read out, stored in a suitable print queue and then printed.

Loan transactions are subject to restrictions and constraints imposed by various state governments and agencies. Laws and regulations that affect loan transactions vary generally from state to state. The present invention is intended to be used throughout the United States and, thus, the constraints imposed by each state in which a transaction is carried out must be taken into account. Furthermore, as laws and regulations change in a particular state, such changes may be updated. For example, most states regulate the duration of different types of loans, the maximum amounts that may be loaned, the interest rates, the types of loans (e.g. simple interest loans, discount loans or precomputed loans), the definition of a "legal year" (e.g. 360, 365, 367 days) and the formulas used to calculate refunds when a loan is paid off prior to maturity.

Figure 4B:
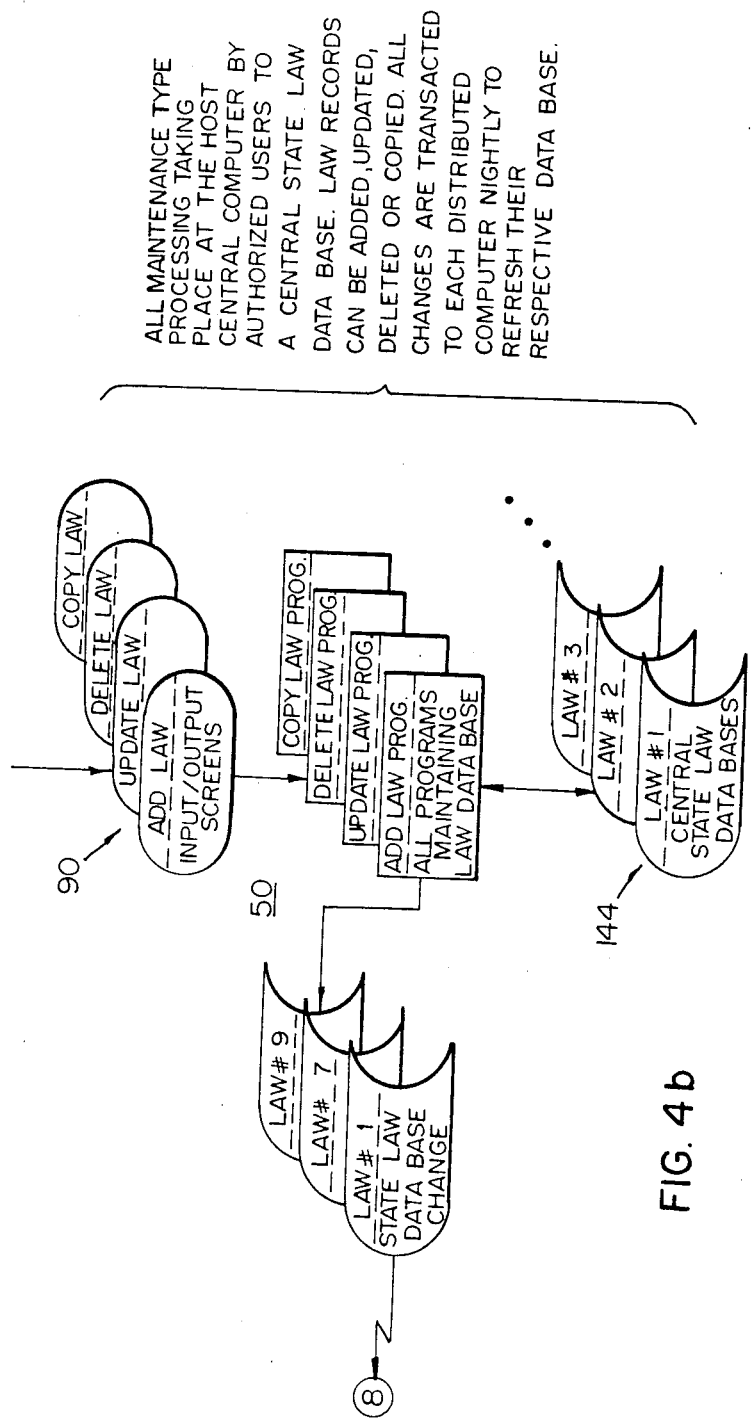

Preferably, each distributed computer is used to store financial information and customer data for one, two or three (or a similarly small number) states. Advantageously, data representing the laws and regulations affecting loan transactions in those states are stored in the data bank of that mini-computer, and FIG. 4A schematically illustrates a state law data base 146 in which such laws and regulations are stored. Host central computer 50 is adapted to store, in a central state law data base 144, the laws and regulations affecting loan transactions in each of the fifty states. As also depicted in FIGS. 4A and 4B, when a law or regulation of a particular state changes, such changes are made in the central state law data base 144 at host central computer 50, as by suitable keyboard operation, and these changes then are transmitted from the central computer to the appropriate distributed mini-computer 52 for storage at the state law data base 146 thereat. Thus, and as an example, terminal 90 coupled to host central computer 50 is operated to add, update, delete or copy various laws and regulations of a particular state into central state law data base 144 under the control of suitable add, update, delete and copy programs provided at the host central computer. Once the data regarding state laws and regulations which affect loan transactions are added, updated, deleted or copied, such revised data is transmitted to the appropriate distributed computer. In FIGS. 4A and 4B, revisions to particular state laws (identified as laws 1, 7 and 9) are made at the host central computer and transmitted therefrom to distributed computer 52.

Although the state law programming at host central computer 50 enables changes to be made in the state law data base, the state law programming at the distributed computers is limited to "read only" operations from the state law data base under the control of the terminal, such as terminal 56. Thus, deliberate or inadvertent tampering of the state law data stored in the data base of a distributed computer is prevented.

When a loan transaction is processed at, for example, terminal 56, for example, when a loan is made, a payment recorded or a loan is paid off, the particular processing is carried out under the control of a suitable program, or routine, such as a loan program, payment program or a pay off program, provided at distributed computer 52. The processing of each such loan transaction is carried out in cooperation with the laws and regulations stored at state law data base 146. If a transaction is attempted which exceeds the limits permitted by the state law, that transaction is rejected. As depicted in FIG. 4A, the processing of each loan transaction utilizes data stored in the customer financial data base 66 as well as the data stored in state law data base 146. A transaction which fails to comply with the limits and/or ranges mandated by state laws and regulations is not permitted.

Figure 5:
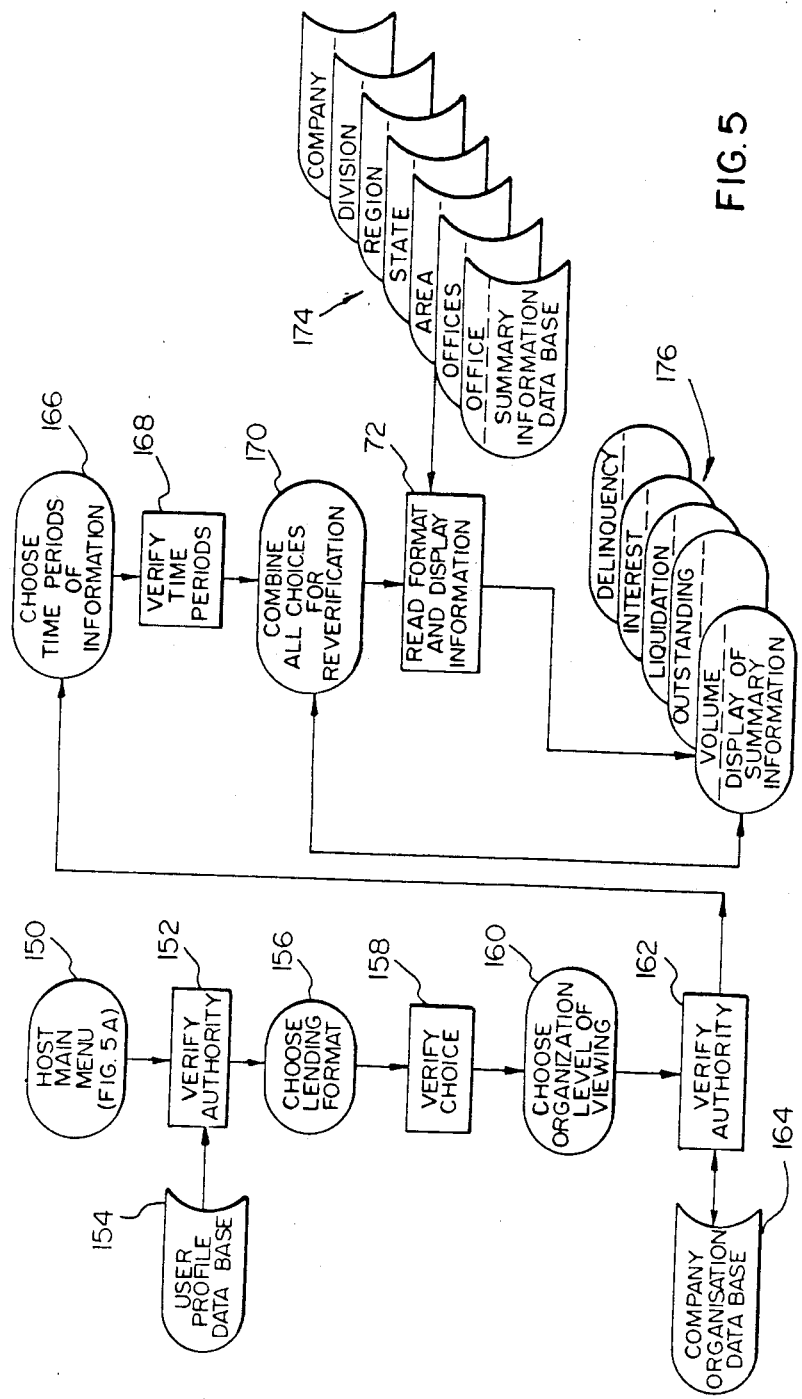
FIG. 5 is a flow chart representation of the manner in which the central processor is programmed to provide displays of various summaries upon requests from authorized operators.

One advantageous feature of the financial data processing system of the present invention is the ability to provide selected, authorized users (such as supervisory operators) with summaries of various financial "products" to indicate various aspects of the operation of the financial system itself. For example, summaries as to volume of certain types of loans or other transactions, the dollar amounts of loans outstanding, the number and dollar amounts of delinquent loans and the number and dollar amounts of loans which are charged off or otherwise uncollectable are provided. These summaries are selectable to indicate the activities of different remote offices, groups or regions of those offices, offices within a particular state, offices within a particular geographic region, offices within particular divisions of the financial institution and offices within different operating subsidiaries, or companies, of, for example, a banking company or bank holding company. Such summaries are obtained by extracting selected financial data from, for example, the various customer data bases 96, 98, etc. at host central computer 50. FIG. 5 illustrates a flow chart representing the manner in which a "summary routine" operates to provide such summaries.

Initially, a user at, for example, the host central computer, operates the terminal connected thereto to display the host main menu 150, the display screen of this host main menu being illustrated in FIG. 5A. Although the user preferably is situated at the central site, it will be appreciated that, if desired, any authorized user located at any terminal in the overall data processing system, such as a user located at a terminal situated in a remote office, may access the summary routine in the host central computer.

After displaying the host main menu (FIG. 5A), the user enters his identification code and, preferably, a "password" known only to him. This identifying data is compared to the user (operator) profile data base 154 stored at host central computer 50 to determine if this user is authorized to obtain summary data. As illustrated in FIG. 5, based upon this comparison, the user's authorization is verified, at 152. Assuming that the user is authorized to proceed, he then chooses a format whose summary is desired, at 156. For example, the user may enter, by keyboard operation, an option number which identifies the particular summary information which he desires. FIG. 5A illustrates the available options which may be selected for providing summary information. Next, the user's authorization to obtain that summary information is verified, at 158.

Assuming that the user is authorized to obtain the selected summary data, he then chooses the organizational level in which he is interested. For example, the user may desire a summary of a particular type of transaction or a summary of particular financial information (e.g. interest earned, loans outstanding, delinquent loans, etc.) for a particular remote office, or a group or region of such remote offices, or a group of offices within a particular state, within a particular geographic area, within a particular division of a financial institution or within a particular subsidiary company within the banking organization or bank holding company.

Once the desired organizational level is selected, the user's authorization to obtain this information at that selected organizational level is verified, at 162. This verification of authorization is determined by comparing the user's identification and selected organizational level with an authorization table stored in, for example, a company organization data base 164. If the user does not have the authority to obtain this summary information at the selected organizational level, his request for same is rejected.

Assuming, however, that the user is authorized to proceed, he then selects, at 166, the time and periods in which he is interested. For example, the user may select summary information for a particular organizational level over the past week, month, annual quarter, year, etc. Once the time period is selected, that time period is verified, at 168, to make certain that the requested time period is available. For example, the user may request summary information over a five-year period of time, but such information might be available in the data base for a lesser period of time. In that instance, the selected time period cannot be verified.

A further verification is made, at 170, to confirm that the user is authorized to obtain a summary of the particular financial data that has been selected, for the particular organizational level which he desires and for the particular time period requested. This further verification is made in conjunction with the information available for summaries, such as the volume of financial transactions, the loans outstanding, the loans which have been charged off or liquidated, the amount of interest which has been earned and the loans which are delinquent. This latter information all is stored in a suitable data base 176.

Then, the requested summary information is read and formatted, at 172, by obtaining from data base 174 summary information extracted from remote offices, groups or regions of those offices, geographic areas in which those offices are located, states in which those offices are located, divisions within the financial institution and subsidiary companies of the banking organization. At step 176, such summary information is displayed at the user's VDT. If desired, a hard copy of the displayed summary may be obtained, this hard copy being printed at the terminal being operated or at any other suitable printer which is supplied with this summary information. If, however, the user has authorization to obtain the requested summary information for some organizational levels but not others, for example, if the user is authorized to obtain summary information from all offices in a particular state but not for offices in a particular division, and if the user has requested this summary information by division, a suitable error message will be displayed on his VDT noting his lack of suitable authorization. This error message is produced at 172 in response to the reverification step at 170. For example, the user may first request summary information for a particular remote office and then for all offices within a particular geographic area and then for all offices within a particular state and then for all offices within a division of the financial institution. Such summary information will be displayed for all of these requests except for a request for summary information of a division. A response to the latter request will be displayed as an error message noting his lack of authorization therefor.

Another aspect of the financial data processing system of the present invention is the cash management control over each remote office included in the system as well as cash management control of the overall financial institution of which the remote offices are a part. As loan payments, deposits and withdrawals are made at each remote office, the cash balance thereat is updated. At the end of a working day, the bank account, for example, at a local bank for that branch office is adjusted. For example, if loan payments and deposits exceed withdrawals and other pay-outs, the bank balance for that office is increased. Conversely, if withdrawals and pay-outs exceed cash income, the bank balance is reduced. Information regarding the bank balances of all remote offices are transmitted to the host central computer for accumulation, and the host computer then directs the Federal Reserve System to draw down electronically the bank balances at the respective local banks for credit to the Federal Reserve account of the financial institution.

Figure 6A:
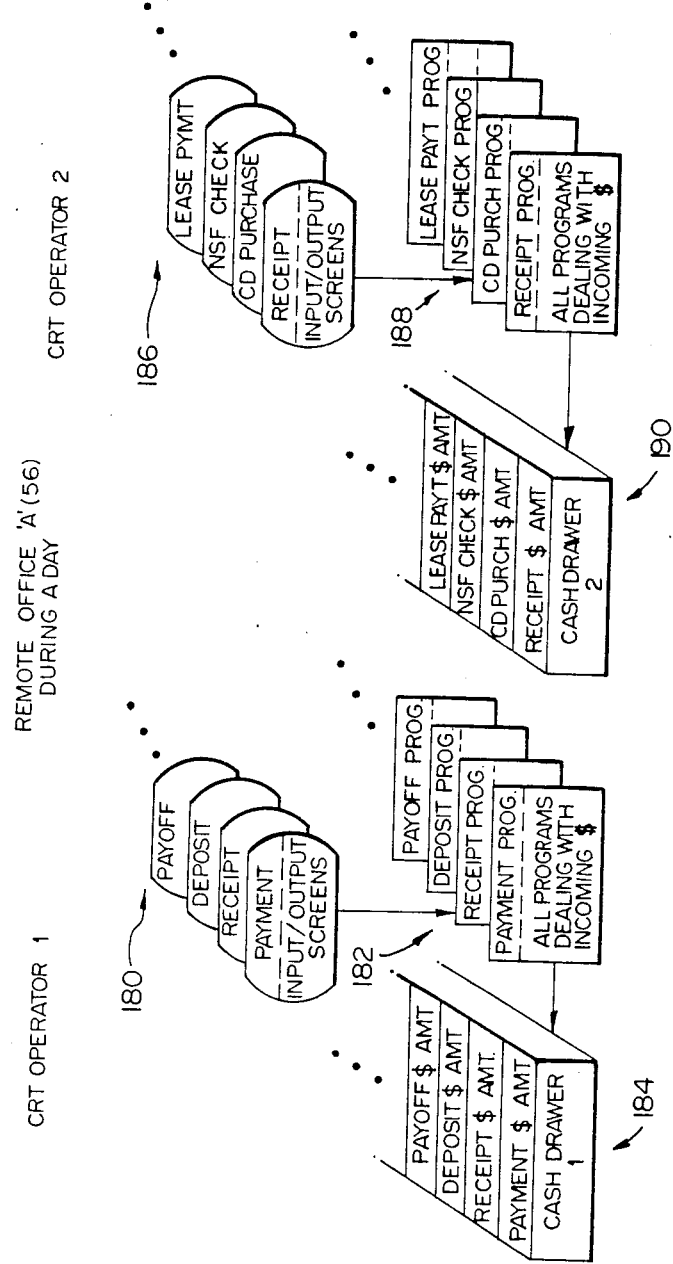
FIGS. 6A and 6B are schematic representations of the manner in which the central processor is programmed for cash management control at a remote office (i.e. an office connected to a distributed minicomputer)
Figure 6B:
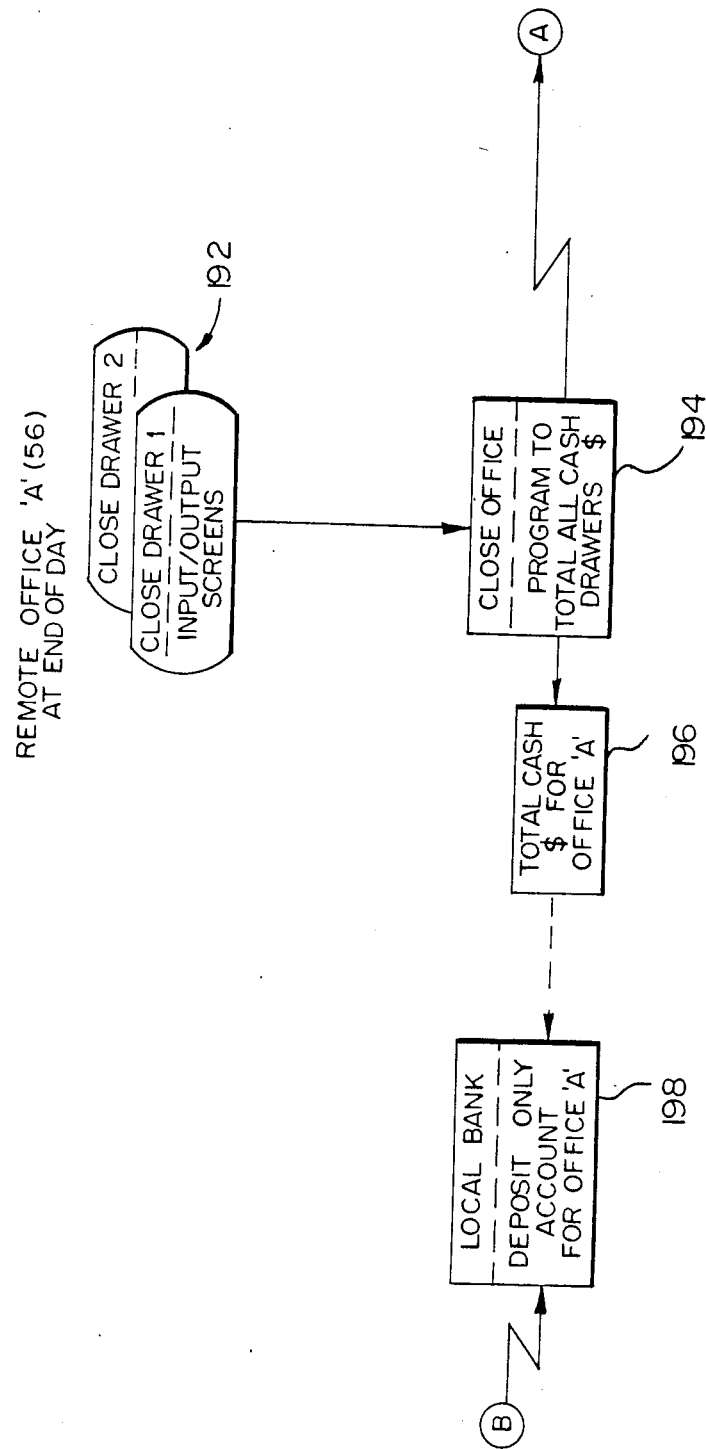
Figure 6C:
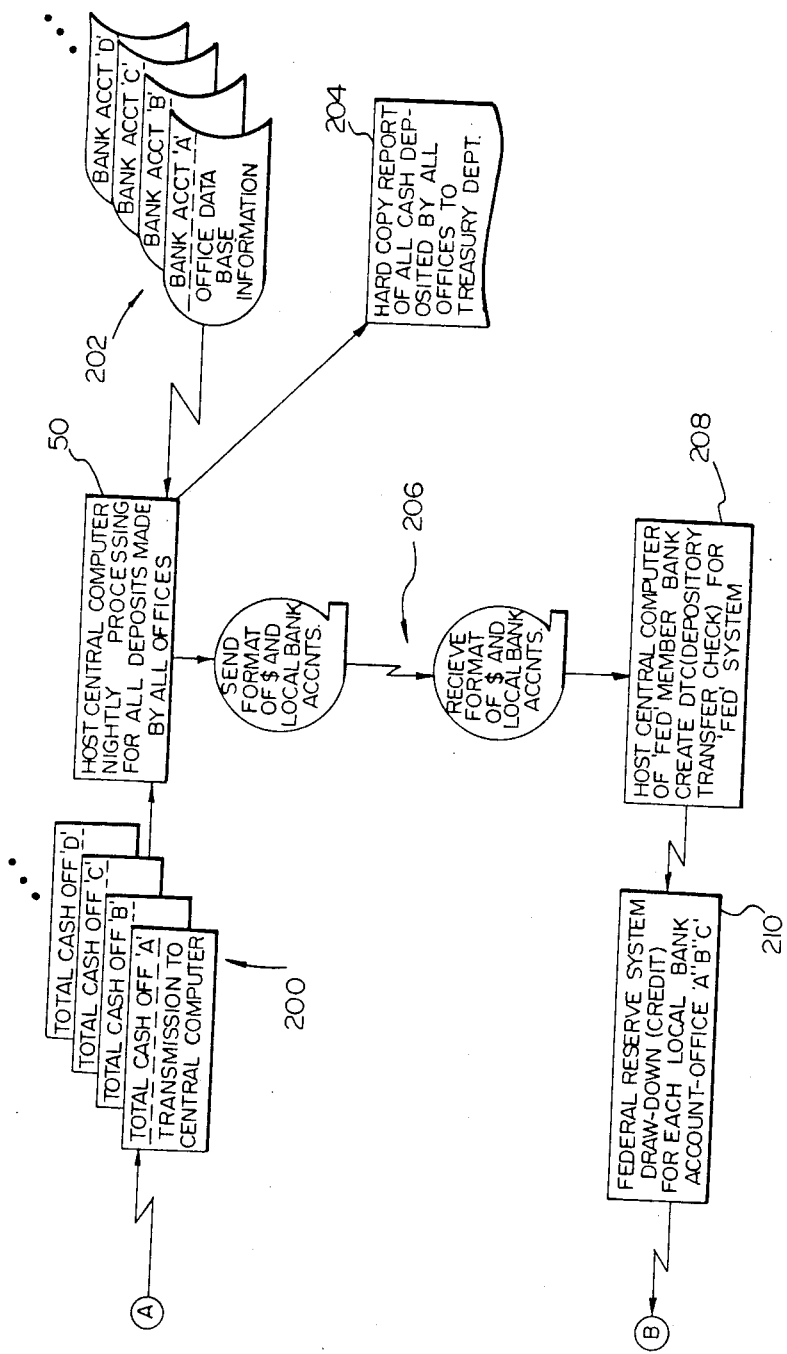

The foregoing is depicted in FIGS. 6A and 6B. FIG. 6A represents the presence of two terminals in remote office 56, these terminals operating during a working day to process various financial transactions. For example, at one terminal in remote office 56, an operator processes, during the day, various loan payments, receipt of funds, deposits from customers and payoffs of loans. This is depicted at 180. Suitable programs 182 are provided for processing such loan payments, receipts, deposits and payoffs. As each transaction is processed, a so-called "cash draw" is updated to keep account of such payments, receipts, deposits and payoffs. Hence, monetary balances are maintained and adjuted throughout the day, and the particular categories in which those monetary balances are maintained are indicated.

As also shown in FIG. 6A, another operator processes various receipts, purchases of certificates of deposits, check deposits which are refused because of insufficient funds, and payments in connection with property leases, all as depicted schematically at 186. Such receipts, CD purchases, insufficient fund check returns and lease payments are processed in accordance with appropriate programs therefor at the distributed computer, as depicted at 188, and the monetary balances of a cash drawer 190 are updated with each transaction.

Thus, it is recognized that cash drawers 184 and 190 reflect the increase/decrease in balances in response to each processed transaction at remote office 56. Similar operations are carried out in the cash drawers provided at the remaining remote offices each day throughout the financial data processing system.

Turning now to FIG. 6B, at the end of a working day, the cash drawers at each remote office are closed. Thus, as depicted at 192, cash drawers 184 and 190 at remote office 56 are closed. If desired, summaries of the transactions made to and from each cash drawer may be displayed at the VDT of the respective terminals having control over those cash drawers. After the cash drawers are closed, the cash balances therein are totaled, at 194, and a total cash balance at the end of the working day is provided at 196. The cash balance is deposited at, for example, a local bank 198 in the particular account for remote office 56. Desirably, this bank account is a so-called "deposit only" account in which remote office 56 is capable of electronically depositing funds into that account but cannot withdraw funds therefrom.

As also depicted in FIG. 6B, data representing the totals of the respective cash drawers included at remote office 56 are transmitted to host central computer 50. The cash drawer data transmitted from remote office 56 is received, at 200, along with the cash drawer totals transmitted from those other remote offices which are connected to and communicate with the host central computer. The host central computer includes, in its data bank, bank account information for each of the remote offices, as indicated at 202. This bank account information is updated by the host central computer so that, at the end of each working day, the actual balance in each bank account for each remote office is made current. In this manner, the overall cash position balance of the financial institution are recorded and maintained. If desired, a hard copy report of all deposits made at the end of each working day by each remote office may be printed, at 204. Such hard copy report may be utilized by particular individuals, supervisors and officers of the financial institution. In addition to updating the data base records of the cash balances and bank accounts of each remote office, host central computer 50 formats and transmits electronically the total deposits which are credited to the financial institution to a suitable correspondent bank for notification to the Federal Reserve System. Such formatting and transmission of deposit credits are depicted at 206; and a depository transfer check is created, at 208, for use by the Federal Reserve System to credit the financial institution with the sums of deposits made by the various remote offices. Such credits to the financial institution are balanced by the Federal Reserve System which, as depicted at 210, draws down the corresponding amount of each local bank account for each remote office.

Thus, at the end of each working day, each remote office deposits in its local bank account the sums which it collected during the day. Transfers subsequently are made from each local bank account to the credit of the financial institution; and the Federal Reserve System is apprised of such deposits, transfers and credits. In addition, dated record keeping is maintained at the host central computer to keep account of such local bank deposits, credits to the financial institution and transfers between the local banks and a Federal Reserve member to the credit of the financial institution.

Turning now to particular transactions which may be processed at a remote office under the control of a distributed mini-computer, the main menu displayed on a remote office VDT has been described above in conjunction with FIG. 2 and is illustrated in FIG. 7. Let it be assumed that an operator, after examining the main menu shown in FIG. 7, selects option "4" to process customer payments at the remote office. As mentioned above, such payments typically are made by mail; although, if desired, an individual customer may personally visit the remote office for the purpose of making a payment on his loan. After selecting option "4", the "customer payment" menu illustrated in FIG. 8 is displayed on the VDT display screen. It is assumed, for the purpose of the present discussion, that the operator wishes to process multiple payments that have been received by mail. That is, payments received from several customers are to be processed, credited to the customers' accounts, and the customers' records are to be updated accordingly. Consequently, it is assumed that, in response to the customer payment menu illustrated in FIG. 8, the operator selects option "1", the multiple payment function.

Figure 10A:
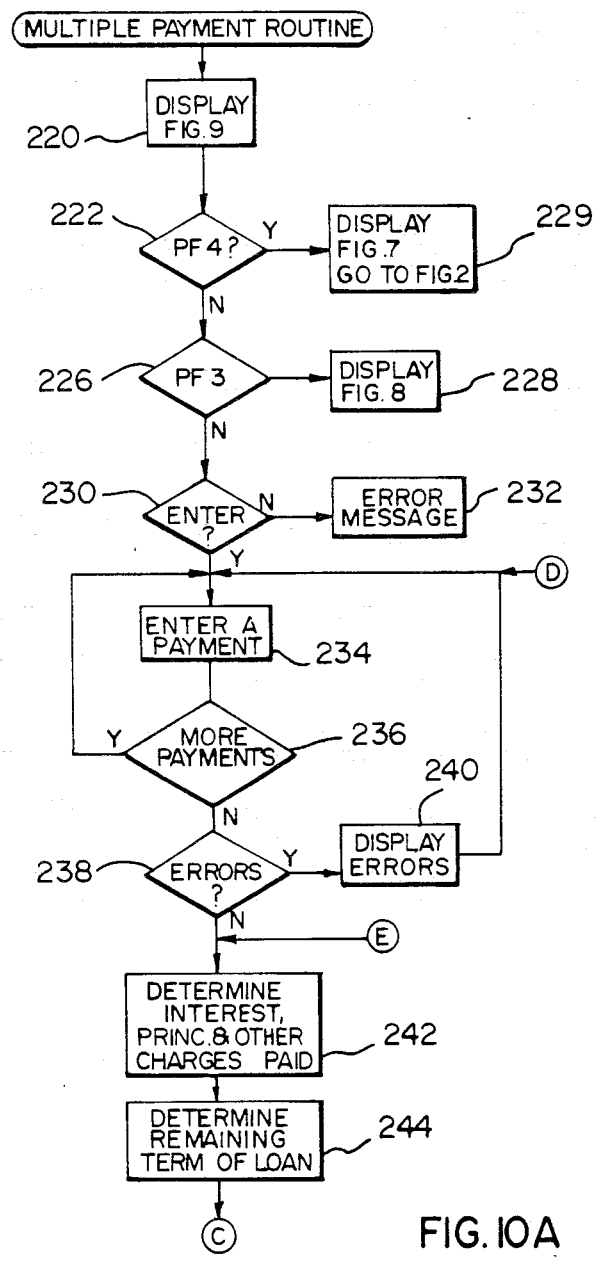
FIGS. 10A and 10B constitute a flow chart of the manner in which the "multiple payment" financial transaction is implemented.
Figure 10:
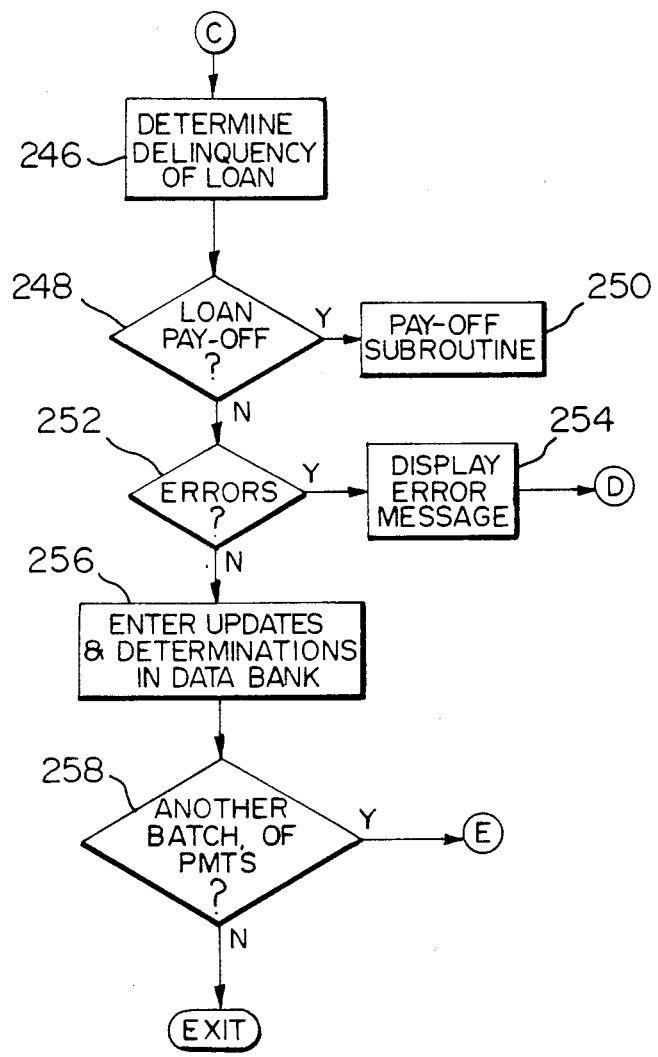

Turning now to FIGS. 10A and 10B, a flow chart representing the manner in which the multiple payment routine is executed, now will be described. Initially, the display screen illustrated in FIG. 9 is displayed on the user's VDT, as indicated at 220. The user then operates the keyboard to select one of the following functions:

If the "enter" key is operated, the user may continue with the multiple payment routine. If function key "1" is operated, a so-called "help" message is displayed to provide instructions and explanatory messages to the user.

If function key "3" is operated, the previous display screen, that is, the display screen illustrated in FIG. 8, is displayed.

If function key "4" is operated, the main menu shown in FIG. 7 is displayed on the display screen.

Accordingly, after the multiple payment screen shown in FIG. 9 is displayed, inquiry is made, at 222, if function key "4" has been operated. If this inquiry is answered in the affirmative, the multiple payment routine advances to 224 at which the main menu shown in FIG. 7 is displayed. The program of the distributed computer then advances to the main menu routine described above in conjunction with FIG. 2.

If inquiry 222 is answered in the negative, inquiry 226 is made to determine if function key "3" has been operated. If so, the prior display screen, illustrated in FIG. 8, is displayed. The user then may select a different option whose choice is displayed.

If inquiry 226 is answered in the negative, inquiry then is made at 230 to determine if the "enter" key has been operated. If this inquiry is answered in the negative, it is assumed that a key other than the "enter", "1", "3" and "4" function keys had been operated. Such other entry is, at this stage, an invalid entry and an error message is displayed, as indicated at 232. For example, the error message might state that an invalid function key has been selected.

Assuming that inquiry 230 is answered in the affirmative, the operator then enters a payment, as indicated at 234. In particular, the keyboard is operated to enter a customer's account number and the amount of payment that has been received from that customer. Once this data is entered, the multiple payment routine advances to inquiry 236 to determine if data representing additional payments are to be entered. If inquiry 236 is answered in the affirmative, the routine returns to instruction 234; and the routine then cycles through the illustrated loop to permit additional payment data, including account numbers and received payments, to be entered.

If all available entries have been made, for example, if data representing the payments of twelve separate loans have been entered, inquiry 236 is answered in the negative; and the multiple payment routine advances to inquire, at 238, if any errors have been made in the entry of data. For example, if an erroneous account number has been entered or if an invalid function key has been operated, or if an erroneous amount has been entered for payment (e.g. a dollar amount that is in excess of expected payments), inquiry 238 is answered in the affirmative. The illustrated routine then advances to instruction 240 at which an appropriate error message is displayed to apprise the operator of the erroneous entry. Then, the multiple payment routine returns to instruction 234 to permit the erroneous entry or entries to be corrected.

If inquiry 238 is answered in the negative, the program advances to instruction 242 at which the credits of the entered payment to interest, principal payment and other charges are determined. The routine then advances to instruction 244 at which the remaining term of the loan outstanding is determined. It is appreciated that the distributed computer is provided with a real time clock which registers and indicates calendar dates (as indicated in the upper right-hand corner of the display screens shown in FIGS. 7-9). Thus, the date on which a payment is entered by the operator is registered by the distributed computer and, thus, the term of remaining payments on each loan is determined merely by subtracting this date from the loan duration stored in the data bank.

The multiple payment routine then advances to instruction 246 to determine whether any of the loans whose data has been entered is delinquent. For example, if the date of entry of a loan payment is later than the expected due date, that loan is considered to be delinquent by the number of late days. Then, the routine advances to inquiry 248 to determine which, if any, of the loans have been paid off. For example. if the amount of the loan payment credited to principal exceeds the principal amount outstanding, inquiry 248 is answered in the affirmative. The distributed computer then advances to a pay-off subroutine 250 which determines whether the customer is entitled to a return or refund of any payments or if some small amount of interest remains due.

If inquiry 248 is answered in the negative, the multiple payment routine advances to inquiry 252 to determine whether any errors are present as a result of the determinations made in steps 242, 244 and 246. If errors are present, the routine advances to instruction 254 at which an appropriate error message is displayed on the display screen. This error message is displayed under the heading "response" in alignment with the particular account for which an error has been detected. The routine then returns to step 234 for the purpose of permitting corrected data to be entered.

If inquiry 252 is answered in the negative, that is, if all of the entered loan payments have been processed correctly and no errors have been made in entering data or in making any of the determinations noted in instrucions 242, 244 and 246, the multiple payment routine advances to instruction 256. As indicated, the loan payment data is used to update the information stored in the data bank with respect to each loan account. That is, the data bank now stores information as to the amount of loan principal outstanding, the remaining duration of the loan, the due date for the next loan payment, the date on which a loan statement will be sent to the customer, the amount of interest that has been paid to date, and so on. Then, inquiry is made at 258 if another batch of loan payments are to be entered. That is, and in accordance with the example described herein, the operator enters a batch of twelve loan payment entries for each display screen illustrated in FIG. 9. The determinations made at steps 242 et seq. may be made after the operator has entered data relating to all loan payments that have been received. For example, although data concerning twelve accounts may be entered for each display screen, several such loan entry transactions may be made before any of the aforementioned determinations are effected. That is, if one hundred entries are to be made, such entries are made twelve at a time. After all one hundred entries have been effected, the aforementioned determinations may be made. However, such determinations are processed on the basis of twelve accounts at a time. Hence, inquiry 258 is answered in the affirmative if the determinations of remaining loan payments are to be carried out. If this inquiry is answered in the affirmative, the multiple payment routine returns to instruction 242. However, if the determinations of all loan payments have been processed (e.g. if all one hundred loan payments have been processed by the aforementioned instructions 242 et seq.), inquiry 258 is answered in the negative. The program of the distributed computer then exits from the multiple payment routine.

It will be appreciated that, if desired, the determinations described in conjunction with steps 242 et seq. may be made after the entry of each batch of, for example, twelve loan payments. In this alternative, if inquiry 258 is answered in the affirmative, that is, if the operator wishes to enter additional loan payment data, the multiple payment routine returns, from inquiry 258, to instruction 234.

The foregoing execution of the multiple payment routine is executed whenever the operator wishes to enter information of batches of loan payments at any time during a working day. As an example, if it takes approximately five minutes for the operator to enter loan payment information for twelve separate accounts, a batch of, for example, one hundred loan payments may be processed within forty-five minutes. It is appreciated that this is a marked improvement in the efficiency of entering and processing loan payments.

The data which is entered by the operator and the determinations which are made by the multiple payment routine described above result in the transfer of data into appropriate data fields in the data bank of the distributed computer. The transfer of data fields into appropriate storage locations is known to those of ordinary skill in the art and further description thereof need not be provided.

Figure 11A:
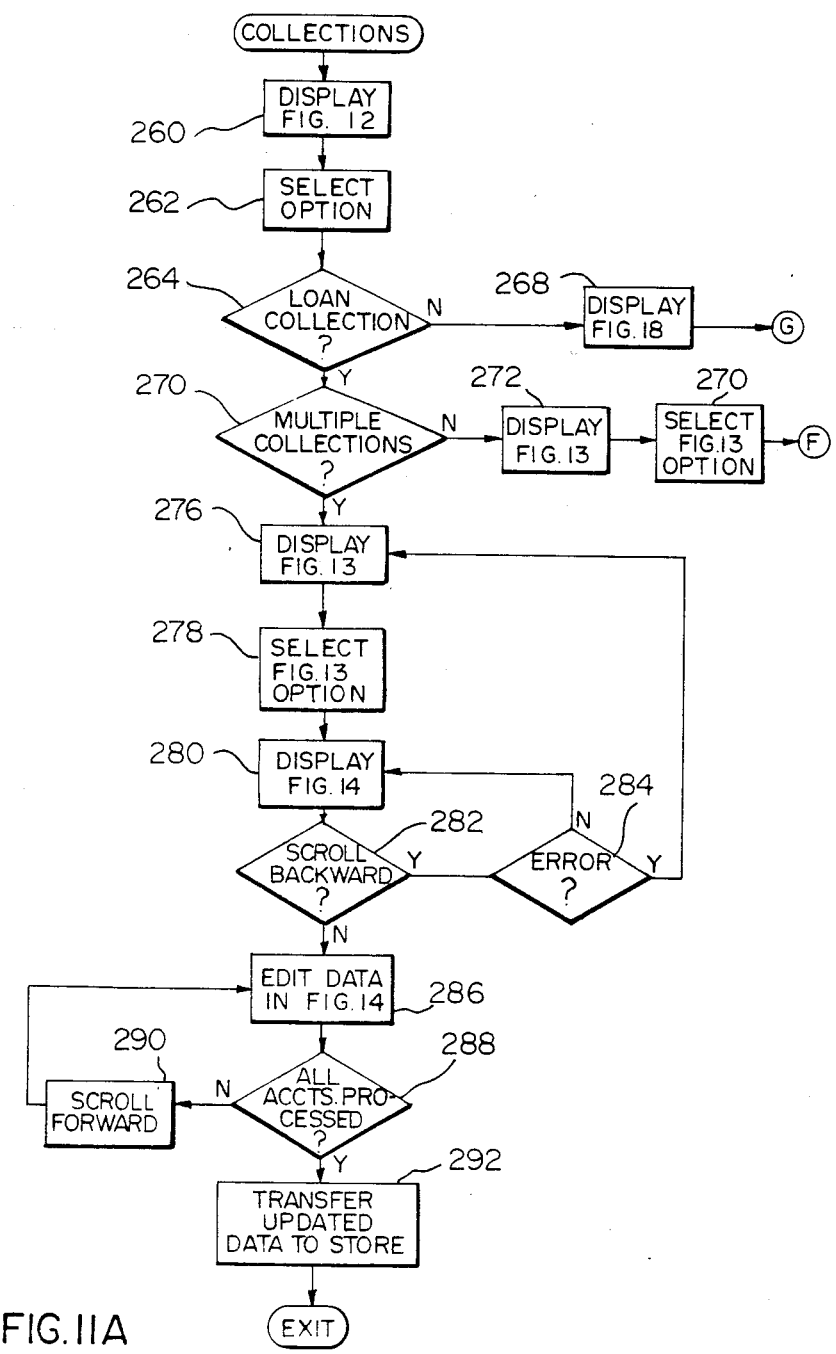

Returning to the main menu illustrated in FIG. 7 which may be re-displayed at a VDT when desired by the operator, such as by pressing function key "4", let it now be assumed that the operator wishes to determine the delinquency status of various loans, for example, for the purpose of contacting customers to expedite payments. This "collections" function may be selected by entering number "5" which identifies the option "customer collections" of the main menu illustrated in FIG. 7. The collections routine now will be described in conjunction with the flow charts illustrated in FIGS. 11A-11C.

Initially, upon selecting the collections option, the information illustrated in FIG. 12 is displayed on the VDT display screen. This display provides the operator with the option of selecting multiple collections (selected as option 1), in which several delinquent accounts are displayed and information concerning those accounts may be obtained and updated, collection function (identified as option 2) in which information concerning individual customer accounts may be displayed and updated, lease collections (identified as option 3) in which information similar to customer collections is displayed and updated with respect to leased property, and lease insurance/title (identified as option 4) which, for the purpose of the present discussion, may be viewed as a function of or auxiliary to the lease collection function.

After a collection option shown in FIG. 12 is selected at 262, inquiry is made, at 264, if the loan collection function has been selected. If this inquiry is answered in the negative, the collections routine advances to instruction 268 at which the display screen shown in FIG.

18 is displayed on the VDT. Further processing in connection with this display screen is described below.

If inquiry 264 is answered in the affirmative, the collections routine advances to inquire, at 270, if the multiple collections option has been selected. If this inquiry is answered in the negative, it is assumed that the collection function (option 2) has been selected; and the display screen illustrated in FIG. 13 is provided at the VDT, as indicated at instruction 272. The operator then selects, at 274, an option illustrated in FIG. 13, and this will be described further below.

If the multiple collections option (option 1) has been selected, inquiry 270 is answered in the affirmative; and the collections routine advances to instruction 276 at which the display screen illustrated in FIG. 13 is displayed on the VDT. The operator then may select one of the illustrated options to learn of those accounts which are delinquent by the periods illustrated in FIG. 13. In addition, accounts which are potential charge offs (option 9), or accounts which are foreclosed (option 10), or accounts subjected to legal proceedings (option 11), or accounts against which judgments have been obtained (option 12), or accounts which are bankrupt (option 13), or accounts which have been charged off (option 14) may be selected. In addition, the status of all accounts may be selected by selecting option 15. FIG. 13 also indicates the number of "pages" of data associated with such delinquent accounts that are stored in the data bank. Of course, the greater the number of accounts associated with a particular delinquency category, the greater are the number of pages of data concerning those accounts stored in the data bank.

After an option represented in FIG. 13 is selected, as represented by instruction 278, data of those accounts having the selected delinquency are displayed, as represented by instruction 280. The VDT display screen is illustrated in FIG. 14. Let it be assumed that option 4 has been selected, whereupon the information illustrated in FIG. 14 represents five separate accounts whose payment delinquencies are greater than fifteen days but less than thirty days. This data identifies the customer, a telephone number at which the customer can be reached, the balance of his loan, the monthly payments due on his loan and the total amount of overdue monthly payments. Additional information also is illustrated which, for the purpose of the present discussion, is not needed for an adequate understanding.

As also illustrated in FIG. 14, the operator may select various function keys to effect a forward or backward scroll to view data associated with other similar delinquent accounts, a return to a prior display screen (e.g. to return to the display screen illustrated in FIG. 13), to return to the main menu (illustrated in FIG. 7) or to continue with the present function. Inquiry is made at 282 if the operator has depressed a function key for the purpose of scrolling backward. If so, inquiry is made as to whether an error is present, for example, if the VDT displays the first screen, it is not possible to scroll backward, and if the error inquiry 284 is answered in the negative, a backward scrolling operation is achieved, resulting in a display similar to that shown in FIG. 14. However, if a backward scroll is not possible, that is, if FIG. 14 represents the first screen of data, inquiry 284 is answered in the affirmative and the collections routine returns to instruction 276 at which the display screen illustrated in FIG. 13 is displayed.

However, if inquiry 282 is answered in the negative, that is, if a backward scroll is not requested, the various data fields illustrated in FIG. 14 may be edited, as indicated at 286, by the operator. For example, various remarks and other codes may be entered where appropriate. Then, inquiry is made at 288 if all of the accounts which are displayed on the VDT display screen have been processed. If not, a scroll forward instruction 290 is carried out; and the next screen of data associated with the selected option (similar to the data illustrated in FIG. 14) is displayed. Data fields in these additional accounts then may be edited; and the collections routine cycles through 286, 288 and 290 until all accounts have been processed. At that time, inquiry 288 is answered in the affirmative and the updated data, that is, the data which has been revised, modified and otherwise changed in the respective data fields, are transferred to the data bank. Hence, information regarding delinquent accounts is updated in "batch" processing.

Returning to inquiries 264 and 270 of the collections routine, let it be assumed that the loan collections option has been selected and that the collection function (option 2) also has been selected. That is, it is assumed that inquiry 264 is answered in the affirmative but inquiry 270 is answered in the negative. The selection of the collection function option results in the display of the display screen illustrated in FIG. 13; and once again the operator has the option of selecting, at 274, a category of loans which are delinquent.

Let it be assumed that option 1 has been selected, whereupon the operator wishes to examine and, possibly, update information in connection with those customer loans which are delinquent by up to five days. Upon selecting option 1 at instruction 274, the collections routine advances to instruction 294, whereupon the information illustrated in FIG. 15 is displayed on the VDT display screen. As illustrated, this information presents the name of each customer, his account balance, a date on which he should be telephoned to inquire of his delinquent payments, a date (designated the "hold" date) on which his delinquent payment is expected, and the optimum time to inquire of that customer. Other data associated with the customer and his account also may be provided, as needed.

Following the display of the information illustrated in FIG. 15, as represented by instruction 294, the operator then selects a particular account for which additional information is desired. This selection operation, represented by instruction 296, is achieved by selecting the option numeral adjacent the desired account. Upon selecting a particular account, detailed information representative thereof is displayed, as represented by instruction 298, the display screen presented on the VDT being illustrated in FIG. 16. This additional, detailed information is believed to be self-explanatory, and further description thereof is not provided.

After the information illustrated in FIG. 16 is displayed, inquiry is made at 300 to determine if the operator has thereafter selected a scroll backward function. If so, inquiry is made at 302, to determine if an error is present in this selected scroll backward function. That is, if the display screen illustrated in FIG. 16 is the first display screen associated with the selected option, then a backward scroll operation is not permitted; and inquiry 302 is answered in the affirmative. The collections routine then returns to instruction 294, whereupon the display screen illustrated as FIG. 15 is displayed on the VDT. The operator then may select another option. However, if the detailed information associated with a particular customer (or his account) is not the first such display screen, a scroll backward operation is permitted and inquiry 302 is answered in the negative. Accordingly, the previously displayed account data (represented by instruction 298) is re-displayed.

If a scroll backward operation has not been requested, inquiry 300 is answered in the negative and the collections routine advances to instruction 304 whereat selected data fields present in the account represented by the display screen illustrated in FIG. 16 may be edited. For example, a change in the customer's telephone number, the best time at which to inquire of the customer, the number of times he has broken his promise to make a payment, etc., may be entered. After such data fields are updated, the collections routine advances to instruction 306 whereat the display screen illustrated in FIG. 17 is displayed on the VDT. This display screen permits the operator to add various comments, or remarks, regarding the customer's account, inquiries made to that customer to repay his delinquent account, etc. Such remarks may be entered by means of the edit operation 308; and, thereafter, the data which has been edited or updated in the data fields of the display screens illustrated in FIGS. 16 and 17 are transferred to appropriate storage locations of the data bank, as represented by instruction 310. Thus, various changes and revisions in the data fields associated with a particular delinquency account may be made and stored. Thereafter, the program exits from the collections routine.

Let it now be assumed that, while executing the collections routine, the option selected from the display screen illustrated in FIG. 12 is not a loan collections option. That is, let it be assumed that option 3 or 4 has been selected. In that event, inquiry 264 is answered in the negative; and the collections routine advances to instruction 268 for displaying the display screen illustrated in FIG. 18. This display screen is identified as the lease insurance/title follow-up screen and represents, as an example, those customers who have leased automobiles (or other insurable property) for whom the financial institution is collecting lease payments, and the necessary insurance (liability and damage insurance) has expired. FIG. 18 identifies those customers and their accounts whose insurance on such leased property has expired. In addition, FIG. 18 also designates particular customers for which questions have arisen over title or ownership to the leased property.

Following the display of the display screen illustrated in FIG. 18 (instruction 268), the collections routine advances to detect which of the designated accounts has been selected by the operator for further scrutiny. This selection operation is carried out at instruction 312 and more detailed information concerning the selected account is displayed, at 314, having the particular display screen illustrated in FIG. 19. As an example, the information associated with the particular account illustrated in FIG. 19 relates to a leased vehicle. This information includes the initial value of that vehicle, the present, or residual, value thereof, the state and local sales taxes that are included in each lease payment by the customer, the base payment (which, typically, includes a loan repayment), and other information relevant to the account, the leased property and the history of delinquent payments.

Various data fields illustrated in FIG. 19 may be edited by the operator, as represented by instruction 316. After such data fields have been edited, the display screen illustrated in FIG. 20 is displayed on the VDT, as indicated by instruction 318. This display screen permits the operator to enter appropriate comments, updated information and revised data concerning the account. Such edit operation is carried out by means of instruction 320; and the updated and revised information and data fields that have been entered with respect to the displays shown in FIGS. 19 and 20 thereafter are transferred, by instruction 322, to the appropriate storage locations in the data bank. The program of the distributed computer then exits from the collections routine.

The foregoing has described various examples of the programs used to carry out particular functions of the financial data processing system of the present invention. Not all functions performed by this system have been described, nor have all functions been explained in detail. It will be appreciated that flow charts similar to those discussed above may be used to characterize or represent the additional functions not described in detail herein. It also will be understood that, as a result of the various revisions and updating of the data fields associated with respective accounts, the payment and collection histories of those accounts may be displayed on the VDT, if desired. Also, although not described in detail herein, but nevertheless represented by the display screen illustrated in FIG. 13, those loans which have not been repaid and, thus, result in a loss of loan principal also may be displayed.

As has been described previously, various summaries may be collected and displayed by extracting from the various data bases information concerning particular aspects of each account, such as the amount outstanding, the amount remaining to be repaid, the amount of interest paid heretofore, the amount of interest due over the remaining duration of the loan, etc. It also is appreciated that a terminal that is connected to host central computer 50 may be coupled through that computer to a selected distributed computer so as to cooperate with the distributed computer in a manner substantially identical to the cooperation between that distributed computer and a terminal connected directly thereto. This enables an operator at the central site to process a transaction or communicate information to and from the distributed computer as if that operator had been located physically in the remote office connected to the distributed computer. Such an operation proceeds as if the host central computer to which the operator actually is connected is "transparent". Likewise, an operator at a remote office may communicate, if sufficiently authorized, directly with the host central computer as if the distributed computer to which that operator is connected is "transparent".

Although not described in detail herein, an operator located at a terminal, either a terminal situated in a remote office or a terminal that is disposed at the central site, may supply information to the distributed computer and, thereby, to the host central computer, relating to an application for a loan by a potential customer. When this function is selected, as by option 2 of the main menu illustrated in FIG. 7, the VDT at which the operator is disposed is provided with a suitable form which invites the entry of information needed to accept or reject the loan application. For example, the applicant's name, address, employer, previous loans, present loans outstanding and other information regarding the customer's history of financial security are entered into a loan application data base. If a modest loan is requested, suitable parameters may be provided in an application review program such that the requested loan may be approved automatically. Alternatively, and for those ma3ority of loans for which more significant sums are requested, the relevant information concerning the request may be displayed at a loan officer's VDT such that an approval/rejection decision may be made promptly and efficiently. The necessity heretofore of providing a formal written loan application thus may be omitted by reason of the present invention.

While this invention has been particularly shown and described with reference to a preferred embodiment, it will be readily appreciated by those of ordinary skill in the art that various changes and modifications may be made without departing from the spirit and scope of the invention. For example, the particular formats of the various display screens described herein may be modified, as desired. Likewise, the present invention should not be limited to the numerical examples described herein. For instance, the number of loan payments that may be processed in a single "batch" may be more or less than the specific number described above. Similarly, a greater or lesser number of options for each of the menus and sub-menus that may be displayed on a VDT are within the scope of this invention. Still further, the VDT need not be limited solely to a cathode ray tube. Other alphanumeric displays may be used, if desired.

It is, therefore, contemplated that the appended claims be interpreted as including the foregoing and other changes and modifications.

What is claimed is:

1. A financial data processing system comprising:

central processing means, including a data bank into which data is written and from which data is read, said data including financial credit transaction information representing the balance outstanding for each credit transaction, the finance charge payable for each credit transaction, the amount due and payable for each periodic payment on said credit transaction, the identity of each obligor of said credit transaction, and the deliquency of payment, if any, on each credit transaction, said central processing means having means for computing from said data each credit transaction outstanding, payment delinquencies of each credit transaction outstanding, collection history of each credit transaction, and unpaid principal balance of a credit transaction;

plural terminal means coupled to said central processing means, each terminal means being operable by an operator to write into said data bank updated financial credit transaction information;

first means at said terminal means for writing into said data bank during a single operation a batch of credit payment data representing payment amounts and the identities of respective obligors for a batch of credit transaction payments;

second means at saisd terminal means for writing into said data bank credit transaction application data representing the identity of each applicant, the amount, type and duration of the requested credit transaction, the finance charge payable on the requested credit transaction, and data representing the applicant,s ability to repay the requested credit transaction and in the event that the requested credit transaction is not completed, said application data for that requested credit transaction being retained in said data bank for at least a predetermined period of time thereafter;

plural display means coupled to said central processing means, each display means being operable to display data stored in said data bank; and means for retrieving from said data bank and supplying to said display means payment data and credit transaction application data currently or previously written into said data bank by said operator, and summary data derived from said data bank and representing summaries of plural credit transactions outstanding, payment deliquencies of said plural credit transactions outstandiing, collection histories, and loss of amounts resulting from credit transations which are not properly repaid.

2. The system of claim 1 wherein at least some of said terminal and display means are located in offices remote from said central processing means; and further including data communication means for interconnecting said offices with said central processing means to enable data to flow therebetween.

3. The system of claim 2 wherein groups of said offices comprise respective regions; and wherein data that is written into said central processing means from a first office in a region is accessible to a second office in said region.

4. The system of claim 3 wherein said central processing means includes access identifying means for identifying predetermined access codes entered from the terminal means in offices located in said region to read out to the office from which an identified predetermined access code is entered data stored in said data bank and to write data into said data bank from that office.

5. The system of claim 1 wherein said central processing means comprises a plurality of distributed processors, each coupled to a respective group of terminal means and display means, each distributed processor including a data bank for storing credit transaction information of those credit transactions processed by the terminal means coupled thereto.

6. The system of claim 5 wherein said central processing means further comprises a host computer operable to communicate with each distributed processor and including a data bank for storing back-up credit transaction information for all of said distributed processors; and means for transmitting to said host computer updated credit transaction information that had been written into the data bank of a distributed processor.

7. The system of claim 6 further comprising at least one terminal and display means connected to said host computer; and means for coupling the last-mentioned terminal and display means to a distributed processor selected by an operator of said last-mentioned terminal and display means for reading credit transaction information from and writing credit transaction information into the data bank of said selected distributed processor.

8. The system of claim 1 wherein said central processing means is programmed to cause said display means to display a menu of selectable financial data processing trnasactions, including credit trnasaction applications, credit transaction payments, deliquencies of credit transactions outstanding, and obligor information; and said central processing means is further programmed to respond to the selection at a terminal means of one of the displayed financial data processing transactions to cause said display means to display a sub-menu of informational catetgories, each being selectable to provide predetermined details of the selected informational category.

9. The system of claim 8 wherein said central processing means is responsive to the selection at said terminal means of a "batch of credit payment" informational category to cause said display means to display a format by which plural credit transaction payments are entered for writing into said data bank and to enable said terminal means to be operated for indicating the identity of a credit transaction and the amount of payment credited to that transaction.

10. The system of claim 9 wherein said central processing means is further programmed to detect erroneous operations of said terminal means and to cause said display means to display said erroneous operations and thereby permit corrected operation of said terminal means.

11. The system of claim 9 wherein said central processing means is programmed to determine the amount of each credit transaction payment that is credited to the repayment of principal, the payment of interest, and the payment of selectable predetermined fees.

12. The system of claim 11 wherein said central processing means is additionally programmed to calculate and store in said data bank the remaining principal balance due on said credit transaction following said credit transaction payment, and to store the history of payments on said credit transaction and the delinquencies, if any, of said payments.

13. The system of claim 8 wherein said central processing means is responsive to the selection at said terminal means of a "loan collection" informational category to cause said display means to display information of the balance due on each of several, predetermined delinquent loans, and the date on which inquiry should be made to the obligor of each of said predetermined delinquent loans.

14. The system of claim 13 wherein said central processing means is programmed to respond to the selection at said terminal means of one of said predetermined delinquent loans to cause said display means to display information stored in said data bank of the history of delinquent payments, if any, of said loan, the number of previous inquiries made to said obligor, the remaining balance and duration of said loan, and the amount of each periodic payment due on said loan.

15. The system of claim 14 wherein said central processing means is programmed to update the information stored in said data bank when said terminal means operates to write thereinto information on each payment on said loan and information on each inquiry made to said obligor, the last-mentioned information including the date of inquiry and the date of expected loan payment.

16. The system of claim 8 wherein said data bank additionally stores data representing property leased to a lessee and financial loan information associated with the leased property; and wherein said central processing means is responsive to the selection at said terminal means of a "lease collection" informational category to cause said display means to display information on the leased property, including the present value thereof, the duration of the lease, the amount of each periodic lease payment, and the history of delinquent lease payments, if any.

17. The system of claim 16 wherein said central processing means is programmed to respond to the operation of said terminal means to write into said data bank information on each lease payment and information on each inquiry made to the lessee, including the date of each inquiry.

18. A financial data processing system comprising central processing means including a data bank for writing in and reading out financial data of loan activity (the amount of a loan outstanding, the amount and expected dates of periodic loan payments, the interest rates of respective loans, the identities of loan customers, the delinquencies of respective loans, the histories of loan repayments, the remaining durations of respective loans, the identities of property securing respective loans); plural terminals coupled to said central processing means, each terminal having input means for accessing said financial data from said data bank and for entering and supplying updated financial data to said data bank at least during a loan processing transaction, means for receiving data supplied from said central processing means, and display means for displaying the accessed and entered financial data, said display means including a multi-color video display for displaying fixed predetermined informative headings in a first color, updatable financial data in a second color, variable identifying information in a third color, and erroneous entries in a fourth color, said central processing means being programmed to designate the type of data supplied to a terminal and, thus, the particular color in which that data is displayed, and said central processing means being programmed to write into said data bank only financial data that is displayed in said second color during loan processing transactions.

19. A method of processing financial data comprising the steps of:
storing in a data bank, into which data is written and from which data is read, financial credit transaction data representing the balance for each credit transaction outstanding, the finance change payable for each credit transaction, the amount due and payable for each periodic payment on said credit transaction, the identity of each obligor of said credit transaction, and the deliquency of payment, if any, on each credit transaction;
operating ones of plural terminal means, which are coupled to said data bank, to write into and read from said data bank updated credit transaction data;
writing into said data bank during a single operation a batch of credit payment data representing payment amounts and the identities of respective obligors for a batch of credit transaction payments;
writing into said data bank credit trnasaction application data representing the identity of each applicant, the amount, type and duration of the requested credit transaction, the finance charge payable on the requested credit transaction and data representing the applicant's ability to repay the requested credit transaction and in the event that the requested credit transaction is not completed said application data for that requested transaction being retained in said data bank for at least a predetermined period of time thereafter; and
retrieving from said data bank and displaying data currently or previously written to said data bank, including payment data and credit transaction application data, and summary data derived from said data bank and representing summaries of plural credit transactions outstanding, payment deliquencies of said plural credit transactions outstanding, collection histories, and loss of amounts resulting from credit transactions which are not properly repaid.

* * * * *

UNITED STATES PATENT AND TRADEMARK OFFICE
CERTIFICATE OF CORRECTION

PATENT NO. : 4,774,664
DATED : September 27, 1988
INVENTOR(S) : Joseph J. Campbell et al.

It is certified that error appears in the above-identified patent and that said Letters Patent are hereby corrected as shown below:

Column 25, Claim 1, line 57, before "terminal", correct the spelling of "said";

line 63, change "applicant,s" to --applicant's--.

Column 26, Claim 8, line 59, correct the spelling of "transaction".

Column 28, Claim 19, line 39, after "operating" insert --individual--;

line 47, correct the spelling of "transaction".

Signed and Sealed this

Seventh Day of February, 1989

Attest:

DONALD J. QUIGG

Attesting Officer     Commissioner of Patents and Trademarks